United States Patent
Cook et al.

(10) Patent No.: US 12,285,961 B2
(45) Date of Patent: Apr. 29, 2025

(54) HEAT TRANSFER AGENTS IN AN IMAGE-FORMING COMPOSITION

(71) Applicant: DataLase Ltd., Widnes Cheshire (GB)

(72) Inventors: Richard Cook, Widnes Cheshire (GB); Martin Walker, Widnes Cheshire (GB)

(73) Assignee: DataLase Ltd., Widnes Cheshire (GB)

(*) Notice: Subject to any disclaimer, the term of this patent is extended or adjusted under 35 U.S.C. 154(b) by 339 days.

(21) Appl. No.: 17/756,925

(22) PCT Filed: Dec. 11, 2020

(86) PCT No.: PCT/GB2020/053186
§ 371 (c)(1),
(2) Date: Jun. 6, 2022

(87) PCT Pub. No.: WO2021/116702
PCT Pub. Date: Jun. 17, 2021

(65) Prior Publication Data
US 2023/0037133 A1    Feb. 2, 2023

(30) Foreign Application Priority Data
Dec. 12, 2019 (GB) ..................................... 1918274

(51) Int. Cl.
| | |
|---|---|
| *B41M 5/28* | (2006.01) |
| *B41M 5/323* | (2006.01) |
| *B41M 5/34* | (2006.01) |
| *B41M 5/46* | (2006.01) |
| *C09D 11/101* | (2014.01) |

(52) U.S. Cl.
CPC ............ *B41M 5/323* (2013.01); *B41M 5/283* (2013.01); *B41M 5/285* (2013.01); *B41M 5/34* (2013.01); *B41M 5/465* (2013.01); *C09D 11/101* (2013.01)

(58) Field of Classification Search
CPC ........ B41M 5/34; B41M 5/283; B41M 5/285; B41M 5/323; B41M 5/465; C09D 11/101
See application file for complete search history.

(56) References Cited

U.S. PATENT DOCUMENTS

| | | | |
|---|---|---|---|
| 5,370,988 A | 12/1994 | Manganiello et al. | |
| 5,439,790 A | 8/1995 | Muthyala et al. | |
| 6,925,051 B2 | 8/2005 | Wisnudel et al. | |
| 7,163,987 B2 | 1/2007 | Weber et al. | |
| 7,485,403 B2* | 2/2009 | Khan | C09J 129/04 430/320 |
| 10,005,304 B2 | 6/2018 | Clayton et al. | |
| 2003/0108689 A1 | 6/2003 | Tan et al. | |
| 2005/0049931 A1 | 3/2005 | Wisnudel et al. | |
| 2005/0050571 A1 | 3/2005 | Wisnudel et al. | |
| 2010/0059691 A1 | 3/2010 | Lewis et al. | |
| 2011/0248225 A1 | 10/2011 | Mamak et al. | |
| 2014/0028011 A1 | 1/2014 | Yamauchi et al. | |
| 2014/0057783 A1 | 2/2014 | Stork et al. | |
| 2014/0342903 A1* | 11/2014 | Jarvis | B41M 5/3375 503/201 |
| 2016/0099088 A1* | 4/2016 | Adamchuk | H01B 3/002 524/544 |
| 2016/0168407 A1* | 6/2016 | Jarvis | C23C 16/56 424/443 |
| 2018/0056690 A1 | 3/2018 | Bollstrom et al. | |
| 2018/0141364 A1 | 5/2018 | Steenackers et al. | |

FOREIGN PATENT DOCUMENTS

| | | |
|---|---|---|
| CA | 2855287 | 4/2013 |
| FR | 3065728 | 11/2018 |
| JP | S59-079788 A | 5/1984 |
| JP | H3-034894 A | 2/1991 |
| JP | H07314904 | 12/1995 |
| JP | H0958134 | 3/1997 |
| JP | H0958135 | 3/1997 |
| JP | 2002-264525 A | 9/2002 |
| JP | 2004223884 | 8/2004 |
| JP | 2009-517252 A | 4/2009 |
| JP | 2014-517112 A | 7/2014 |
| JP | 2015-509052 A | 3/2015 |
| JP | 2016-187932 A | 11/2016 |
| WO | 2005/068207 | 7/2005 |
| WO | 2006/108745 | 10/2006 |

(Continued)

OTHER PUBLICATIONS

International Search Report and Written Opinion, International Application No. PCT/EP2021/081293, Jan. 24, 2022, 12 pages.

(Continued)

*Primary Examiner* — Bijan Ahvazi
(74) *Attorney, Agent, or Firm* — SALIWANCHIK, LLOYD & EISENSCHENK

(57) ABSTRACT

The invention is directed towards a composition comprising: a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1-3.5 wt % of the total composition, and the heat transfer agent is present in an amount of 1-15 wt % of the total composition, and the heat transfer agent is present in the composition as solid particles. The invention further relates to substrates comprising the composition applied thereto, as well as methods of forming colour or an image on said substrates.

29 Claims, No Drawings

(56) References Cited

FOREIGN PATENT DOCUMENTS

| WO | WO-2007063332 A2 * | 6/2007 | ............ B41M 5/267 |
|---|---|---|---|
| WO | 2009/093028 | 7/2009 | |
| WO | 2010/001171 | 1/2010 | |
| WO | 2010/029329 | 3/2010 | |
| WO | 2012/114121 | 8/2012 | |
| WO | 2013/068729 | 5/2013 | |
| WO | 2013/098076 | 7/2013 | |
| WO | 2015/015200 | 2/2015 | |
| WO | 2016/184881 | 11/2016 | |
| WO | 2017/157888 | 9/2017 | |
| WO | 2020/105564 | 5/2020 | |

OTHER PUBLICATIONS

International Search Report and Written Opinion, International Application No. PCT/GB2020/053186, PCT/ISA/210 and PCT/ISA/237, mail date Mar. 25, 2021, 9 pages.

* cited by examiner

HEAT TRANSFER AGENTS IN AN IMAGE-FORMING COMPOSITION

CROSS-REFERENCE TO RELATED APPLICATIONS

This application is a national stage application of International Patent Application No. PCT/GB2020/053186, filed Dec. 11, 2020, which claims priority to Great Britain Application No. 1918274.0, filed Dec. 12, 2019, the disclosures of each of which are incorporated herein by reference in their entirety, including any figures, tables, and drawings.

FIELD OF THE INVENTION

The present invention relates to a composition for use in the formation of an image via the application of near-infrared or mid-infrared radiation.

BACKGROUND OF THE INVENTION

The use of near-infrared (NIR) radiation and near-infrared radiation absorbing compounds to affect colour-forming compounds in radiation-reactive compositions applied on or incorporated within substrates is known. Upon exposure to near-infrared radiation, the near-infrared absorbing compounds can absorb the near-infrared radiation and transfer this energy to the colour-forming compounds as heat to effect a change in the colour-forming compounds such that they form colour.

In known systems, in order to ensure that an appropriate amount of heat is transferred from the near-infrared radiation absorbing compound to the colour-forming compound, a sufficient amount of the near-infrared radiation absorbing compound must be present in the composition in close proximity to the colour-forming compound. However, known near-infrared absorbing compounds are typically highly coloured to the human eye, the visible region being adjacent to the near-infrared region of the electromagnetic spectrum. Accordingly, the quantity of near-infrared absorbing compound required often negatively impacts the visual appearance of the radiation-reactive compositions and substrates having the compositions applied thereon, the highly coloured near-infrared radiation absorbing compounds creating a highly coloured background. Such high background colouring is detrimental to the formation of colour or an image on a radiation-reactive composition applied to a substrate.

Binder and carrier components and the like are commonly utilised in such radiation-reactive compositions. These components are formed of insulating materials, such as insulating polymers, which destructively absorb heat from the near-infrared radiation absorbing compound. The components thus melt or soften if the near-infrared radiation absorbing compound and the colour-forming compound are too far apart in the composition such that sufficient heat cannot be transferred to the colour-forming compound, leading to inferior colour formation. In order to counter this effect, insulating materials having a high glass transition temperature (Tg) and high minimum film forming temperature (MFFT) are typically selected as binder and carrier components. Such materials do not begin to negatively absorb heat from the near-infrared radiation absorbing compound and do not display detrimental softening or melting effects. In addition, to further counter the effect, high power near-infrared radiation sources may be utilised. However, this is problematic when the radiation-reactive compositions are applied to perishable heat-sensitive substrates.

It is therefore desirable to provide a composition that facilitates efficient heat transfer from a near-infrared radiation absorbing compound to a colour-forming compound upon application of near-infrared radiation to the composition, achieving improved effective colour formation suitable for forming colour or an image on a substrate.

SUMMARY OF THE INVENTION

According to a first aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to a second aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a third aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

According to a fourth aspect of the present invention, there is provided a substrate comprising a composition applied thereon, the composition comprising: a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to a fifth aspect of the present invention, there is provided a substrate comprising a composition applied thereon, the composition comprising: a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a sixth aspect of the present invention, there is provided a substrate comprising a composition applied thereon, the composition comprising: a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

According to a seventh aspect of the present invention, there is provided a method of forming a substrate comprising applying to the substrate a composition comprising: a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to an eighth aspect of the present invention, there is provided a method of forming a substrate comprising applying to the substrate a composition comprising: a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a ninth aspect of the present invention, there is provided a method of forming a substrate comprising applying to the substrate a composition comprising: a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

According to a tenth aspect of the present invention, there is provided a method of forming colour on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles, and wherein the method comprises exposing the composition to near-infrared or mid-infrared radiation to form colour on the substrate.

According to an eleventh aspect of the present invention, there is provided a method of forming colour on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles, and wherein the method comprises exposing the composition to near-infrared or mid-infrared radiation to form colour on the substrate.

According to a twelfth aspect of the present invention, there is provided a method of forming colour on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles, and wherein the method comprises exposing the composition to near-infrared or mid-infrared radiation to form colour on the substrate.

According to a thirteenth aspect of the present invention, there is provided a method of forming an image on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles, and wherein the method comprises exposing the composition to near-infrared or mid-infrared radiation to form an image on the substrate.

According to a fourteenth aspect of the present invention, there is provided a method of forming an image on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles, and wherein the method comprises exposing the composition to near-infrared or mid-infrared radiation to form an image on the substrate.

According to a fifteenth aspect of the present invention, there is provided a method of forming an image on a substrate comprising a composition applied thereon, the composition comprising a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles, and wherein the method comprises exposing the composition to near-infrared or mid-infrared radiation to form an image on the substrate.

According to a sixteenth aspect of the present invention, there is provided a use of a composition in the formation of colour on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to a seventeenth aspect of the present invention, there is provided a use of a composition in the formation of colour on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a eighteenth aspect of the present invention, there is provided a use of a composition in the formation of colour on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

According to a nineteenth aspect of the present invention, there is provided a use of a composition in the formation of an image on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to a twentieth aspect of the present invention, there is provided a use of a composition in the formation of an image on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a twenty-first aspect of the present invention, there is provided a use of a composition in the formation of an image on a substrate by the application of near-infrared or mid-infrared radiation, the composition comprising a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

DETAILED DESCRIPTION OF THE INVENTION

It has been surprisingly and advantageously found that the incorporation of solid particles of a heat transfer agent in the composition of the present invention enables substantially more efficient heat conduction from the near-infrared radiation absorbing compound to the colour-forming compound, facilitating significantly improved and surprisingly more effective colour formation by the colour-forming compound upon application of near-infrared radiation to the composition. Advantageously, the same effective colour formation has also been demonstrated upon application of mid-infrared radiation to the composition. In addition, it has been surprisingly and advantageously found that selection of: (a) specific heat transfer agents, (b) specific amounts of the near-infrared radiation absorbing compound and the heat transfer agent, and (c) the specific ratio of the near-infrared radiation absorbing compound to heat transfer agent in the composition, facilitates the improved colour formation by the colour-forming compound. The colour formation can occur at reduced fluence (amount of energy delivered by unit area) when the composition is exposed to near-infrared or mid-infrared radiation from a laser source(s) as the heat lost to any binder and carrier components from detrimental effects such as softening and melting is minimised. In addition, the amount of highly coloured near-infrared radiation absorbing compound utilised in the composition can be reduced, such that the composition can display a low background colour. Not only does this reduce costs with regard to expensive near-infrared radiation absorbing compounds, but ultimately, the composition of the present invention demonstrates improved coating integrity, enables faster imaging speeds, and requires lower power, specifically lower fluence, near-infrared radiation sources. The use of lower power and in particular lower fluence near-infrared radiation sources is especially advantageous when the composition is applied to perishable heat-sensitive substrates.

It has further been surprisingly and advantageously found that as a result of the incorporation of a heat transfer agent into a composition comprising a near-infrared radiation absorbing compound and a colour-forming compound, a broader range of binder and carrier components can be utilised in said compositions. Previously, binder and carrier components had to be formed from insulating materials requiring high glass transition temperatures (Tg) and high minimum film forming temperatures (MFFT) to withstand the heat transferred to them from the near-infrared radiation absorbing compound. With the present invention, the presence of a heat transfer agent means that a broader range of binder and carrier components can be used, in particular binder and carrier components having lower glass transition temperatures, as well as lower minimum film forming temperatures can also be used. This facilitates broader commercial application for the compositions of the present invention on a wide range of substrates including heat-sensitive substrates, in particular, polymer films and foils.

It has also been surprisingly and advantageously identified that the benefits of the present invention are much greater than those achieved by: (a) increasing the amount of near-infrared radiation absorbing compound in the composition. This would not only be costly, but would cause the composition to develop a highly coloured background and be detrimental to the formation of an image as excessive heat would be transferred to the composition and colour-forming compound leading to inferior colour formation, in particular due to detrimental effects such as softening and melting as well as decomposition, burning, scorching or ablation; and (b) increasing the amount of colour-forming compound in the composition. This would not only be costly, but would require the near-infrared radiation absorbing compound to facilitate the transfer of increased amounts of heat to fully utilise the additional colour-forming compound, leading to ineffective colour formation, in particular due to detrimental effects such as softening and melting as well as dilution, decomposition, burning, scorching or ablation.

According to a first aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the ratio of the near-infrared radiation absorbing compound to heat transfer agent in the composition is 1:1 to 1:100, and wherein the heat transfer agent is present in the composition as solid particles.

According to a second aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the near-infrared radiation absorbing compound is present in an amount of 0.1 to 3.5 wt % of the composition, and the heat transfer agent is present in an amount of 1 to 15 wt % of the composition, and wherein the heat transfer agent is present in the composition as solid particles.

According to a third aspect of the present invention, there is provided a composition comprising: a near-infrared radiation absorbing compound; a colour-forming compound; and a heat transfer agent operable to facilitate heat transfer from the near-infrared radiation absorbing compound to the colour-forming compound; wherein the heat transfer agent is selected from a metal oxide, a metal pyrophosphate, and a metal phosphate, and wherein the heat transfer agent is present in the composition as solid particles.

The near-infrared radiation absorbing compound may be any suitable compound that is capable of absorbing near-infrared or mid-infrared radiation, preferably near-infrared radiation. More than one near-infrared radiation absorbing compound may be present in the composition according to the first, second or third aspect of the present invention. Suitable examples of near-infrared radiation absorbing compounds include, but are not limited to the following: inorganic copper salts, such as copper (II) hydroxyl phosphate; organic NIR dyes and pigments, such as N,N,N',N'-tetrakis (4-dibutylaminophenyl)-p-benzoquinone bis(iminium hexafluoro-antimonate); non-stoichiometric, reduced or doped inorganic compounds such as reduced indium tin oxide, reduced zinc oxide, reduced tungsten oxide, reduced doped tungsten oxide including an inorganic compound of the following formula MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying 0.001≤x/y≤1; and 2.2≤z/y≤3.0.), reduced antimony tin oxide, or doped metal oxides such as aluminium-doped zinc oxide (AZO) and fluorine-doped tin oxide (FTO); conductive polymers such as poly polystyrene sulfonate (PEDOT); and combinations thereof. The near-infrared absorbing compound may be an inorganic copper salt such as copper (II) hydroxyl phosphate.

The near-infrared radiation absorbing compound may have any suitable D50 particle size distribution value. D50 particle size distribution is the mean diameter or mean value of the particle size distribution, i.e. the particle diameter at 50% in the cumulative distribution. Preferably, the D50 particle size distribution value of the near-infrared radiation absorbing compound is 5 μm or less. More preferably, the D50 particle size distribution value of the near-infrared radiation absorbing compound is from 0.5 to 3 μm, and most preferably from 1 to 2 μm.

D50 particle size distribution is measured using a Malvern Mastersizer according to ISO standard 13320:2009.

Preferably, the near-infrared absorbing compound is selected from inorganic copper salts such as copper (II) hydroxyl phosphate; and non-stoichiometric, reduced or doped inorganic compounds such as reduced indium tin oxide, reduced zinc oxide, reduced tungsten oxide, reduced doped tungsten oxide including an inorganic compound of the following formula MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, and ammonium, W is tungsten, O is oxygen, satisfying 0.001≤x/y≤1; and 2.2≤z/y≤3.0.), reduced antimony tin oxide, or doped metal oxides such as aluminium-doped zinc oxide (AZO) and fluorine-doped tin oxide (FTO).

The colour-forming compound may be any suitable compound that forms colour upon exposure of the composition to near-infrared or mid-infrared radiation.

It will be appreciated that the colour-forming compound will be selected based upon the colour(s) desired in the image to be formed.

The colour-forming compound may be selected from a leuco dye, an oxyanion of a multivalent metal, a diacetylene compound, a keto acid compound, or combinations thereof. There may be more than one colour-forming compound present in the composition according to the first, second or third aspect of the present invention.

Preferably, the colour-forming compound is selected from a leuco dye, an oxyanion of a multivalent metal, and a diacetylene compound. More preferably, the colour-forming compound is a leuco dye or an oxyanion of a multivalent metal. Most preferably, the colour-forming compound is a leuco dye.

Leuco Dye

The colour-forming compound may be a leuco dye. Leuco dyes are well known to a skilled person as compounds capable of forming colour. Examples of suitable leuco dyes are contained in WO 2015/015200 and WO 2013/068729, the content of which is incorporated herein by reference. Examples of suitable leuco dyes include, but are not limited to: spiroxazines, naphthopyrans, phthalides, fluorans, triarylmethanes, benzoxazines, quinazolines, spiropyrans, quinones, tetrazolium salts, thiazines, phenazines and oxazines, some of which are disclosed in WO2006/108745, the content of which is incorporated herein by reference.

Suitable suppliers of leuco dyes include, but are not limited to: Yamada Chemical Company Limited, Chameleon Speciality Chemicals Limited, and Connect Chemicals.

The leuco dye may be selected from: 2-Anilino-3-diethylamino-6-methylfluoran, 2-Anilino-6-dibutylamino-3-methylfluoran, 6-(Dimethylamino)-3,3-bis[4-(dimethylamino)phenyl] phthalide, 4,4'-[(9-butyl-9H-carbazol-3-yl) methylene]bis[N-methyl-N-phenylaniline], 3,3'-Bis(1-n-octyl-2-methylindol-3-yl)phthalide, 6'-(Diethylamino)-3-oxo-spiro [isobenzofuran-1(3H),9'-[9H]xanthene]-2'-carboxylic acid ethyl ester, 7-[4-(diethylamino)-2-ethoxyphenyl]-7-(2-methyl-1-octyl-1H-indol-3-yl) Furo[3,4-b]pyridin-5(7H)-one, 2'-(Dibenzylamino)-6'-(diethylamino)fluoran, N,N-dimethyl-4-[2-[2-(octyloxy) phenyl]-6-phenyl-4-pyridinyl]-Benzenamine, and 6'-

(diethylamino)-2'-[(dimethylphenyl)amino]-3'-methylspiro [isobenzofuran-1(3H),9'-[9H]xanthene]-3-one, 2'-anilino-6'-[ethyl(p-tolyl)amino]-3'-methylspiro[isobenzofuran-1 (3H),9'-[9H]xanthene]-3-one (CAS No. 59129-79-2), 4,4'-[(9-butyl-9H-carbazol-3-yl)methylene]bis[N-methyl-N-phenylaniline] (CAS No. 67707-04-4), 6'-(diethylamino)-3-oxo-spiro[isobenzofuran-1(3H),9'-(9H)xanthene]-2'-carboxylic acid ethyl ester (CAS No. 154306-60-2), and 2'-(dibenxylamino)-6'-(diethylamino)fluoran (CAS No. 34372-72-0), 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro [2-benzofuran-3,9'-xanthene]-1-one (CAS No. 29512-49-0), 2-Anilino-6'-[ethyl(p-toyl)amino]-3'-methylspiro[isobenzo-furan-1 (3H),9'-[9H]xanthene]-3-one (CAS No. 59129-79-2), Blue3-CVL 6-(dimethylamino)-3,3-bis-[4-(dimethyl-amino)phenyl) phthalide (CAS No 1522-42-7), Blue-4 4,4'-[(9-butyl-9H-carbazol-3-yl)methylene]bis[N-methyl-N-phenylaniline] (CAS No 67707-04-4), Red-5 3,3'-Bis(1-n-octyl-2-methylindol-3-yl)phthalide (CAS No 50292-95-0), Orange-6 6'-(Diethylamine)-3-oxo-spire [isobenzofuran-1 (3H),9'-[9H] xanthene]-2'-carboxylic add ethyl ester (CAS No 154306-60-2), Blue-8 7-[4-(diethylarnino)-2-ethoxyphe-nyl]-7-(2-methyl-1-octyl-1H-indol-3-yl) Furo[3,4-Npyri-din-5(71-)-one (CAS No 87563-89-1), Green-9 2'-(Diben-zylamino)-6-(diethylamino)fluoran (CAS No 34372-72-0), Yellow-10 N,N-dimethyl-442-[2-(octyloxy)phenyl]-6-phe-nyl-4-pyridinyl]-Benzenamine (CAS No 144190-25-0), Black-15 6'-(diethylamino)-2'-[(dimethylphenyl)amino]-3'-methylspiro [isobenzofuran-1(3H),9'-[9H]xanthene]-3-one (CAS No 36431-22-8), KetoAcid-1 4-(N,N-diethylarnino)-2-hydroxy-2'-carboxybenzophenone (CAS No 5809-23-4), KetoAcid-2 4-(N,N-dibutylarnino)-2-hydroxy-2'-carboxy-benzophenone (CAS No 54574-82-2), 2-Anilino-3-diethyl-amino-6-methylfluoran, 2-Anilino-6-dibutylamino-3-meth-ylfluoran, 6-(Dimethylamino)-3,3-bis [4-(dimethylamino) phenyl] phthalide, 4,4'-[(9-butyl-9H-carbazol-3-yl) methylene]bis[N-methyl-N-phenylaniline], 3,3'-Bis(1-n-octyl-2-methylindol-3-yl)phthalide, 6'-(Diethylamino)-3-oxo-spiro [isobenzofuran-1(3H),9'-[9H] xanthene]-2'-carboxylic acid ethyl ester, 7-[4-(diethylamino)-2-ethoxyphenyl]-7-(2-methyl-1-octyl-1H-indol-3-yl) Furo[3,4-b]pyridin-5(7H)-one, 2'-(Dibenzylamino)-6'-(diethylamino)fluoran, N,N-dimethyl-4-[-2-[2-(octyloxy) phenyl]-6-phenyl-4-pyridinyl]-Benzenamine, and 6'-(diethylamino)-2'-[(dimethylphenyl)amino]-3'-methylspiro [isobenzofuran-1(3H),9'-[9H]xanthene]-3-one, 4,4'-[(9-butyl-9H-carbazol-3-yl)methylene]bis[N-methyl-N-phe-nylaniline], (CAS No. 67707-04-4), 6'-(diethylamino)-3-oxo-spiro[isobenzofuran-1(3H),9'-(9H)xanthene]-2'carboxylic acid ethyl ester (CAS No. 154306-60-2), and 2'-(dibenxylamino)-6'-(diethylamino)fluoran (CAS No. 34372-72-0).

Preferably, the leuco dye is 6-(dimethylamino)-3,3-bis[4-(dimethylamino)phenyl] phthalide, 7-[4-(diethylamino)-2-ethoxyphenyl]-7-(2-methyl-1-octyl-1H-indol-3-yl) furo[3,4-b]pyridin-5(7H)-one, 3,3'-bis(1-n-octyl-2-methylindol-3-yl)phthalide, N,N-dimethyl-4-[2-[2-(octyloxy)phenyl]-6-phenyl-4-pyridinyl]-benzenamine, 6'-(diethylamino)-2'-[(dimethylphenyl)amino]-3'-methylspiro [isobenzofuran-1 (3H),9'-[9H]xanthene]-3-one, 2'-anilino-6'-[ethyl(p-tolyl) amino]-3'-methylspiro[isobenzofuran-1 (3H),9'-[9H] xanthene]-3-one (CAS No. 59129-79-2), 4,4'-[(9-butyl-9H-carbazol-3-yl)methylene]bis[N-methyl-N-phenylaniline] (CAS No. 67707-04-4), 6'-(diethylamino)-3-oxo-spiro [isobenzofuran-1(3H),9'-(9H)xanthene]-2'carboxylic acid ethyl ester (CAS No. 154306-60-2), 2'-Anilino-6'-(dibuty-lamino)-3'-methyl-3H-spiro[2-benzofuran-1,9'-xanthen]-3-one (CAS No. 89331-94-2), 6'-(Diethylamino)-3'-methyl-2'-(phenylamino)spiro[2-benzofuran-3,9'-xanthene]-1-one (CAS No. 29512-49-0) and 2'-(dibenxylamino)-6'-(diethyl-amino)fluoran (CAS No. 34372-72-0).

Preferably, the leuco dye is 2-anilino-3-diethylamino-6-methylfluoran or 2-anilino-6-dibutylamino-3-methylfluoran.

Oxyanion of a Multivalent Metal

The colour-forming compound may be an oxyanion of a multivalent metal, or an oxyacid, and/or hydrate thereof. The oxyanion of a multivalent metal may be any suitable oxy-anion of a multivalent metal (anionic component) present in conjunction with a cationic counterpart. The use of oxyan-ions of multivalent metals in compositions is disclosed in U.S. Pat. No. 7,485,403, the content of which is incorporated herein by reference. The anionic component may be an inorganic metal oxyanion compound such as molybdate including di-, tri-, hexa-, hepta-, octa- and deca-molybdates, tungstate, chromate or analogous transition metal com-pounds also in mixed oxidation states and of mixed inor-ganic metal oxyanions due to trace elements or any higher concentration ratios. Preferably, the accompanying cationic component is an alkali metal or an alkaline earth metal or ammonium. One example of an oxyanion of a multivalent metal is sodium molybdate. Preferred oxyanions of a mul-tivalent metal are ammonium salts of inorganic metal oxy-anion compounds. For example, ammonium paratungstate (APT). Particularly preferred as oxyanions of a multivalent metal are ammonium salts of oxyanions of multivalent metals. A particularly preferred oxyanion of a multivalent metal is ammonium octamolybdate $(NH_4)_4 Mo_8 O_{26}$ or "AOM", which is a commercially available molybdenum composition with the CAS number 12411-64-2.

Preferably, the oxyanion of a multivalent metal is an ammonium salt of an oxyanion of a multivalent metal, such as an ammonium salt of an oxyanion of molybdenum. More preferably, the oxyanion of a multivalent metal is ammo-nium octamolybdate (AOM).

Diacetylene Compound

The colour-forming compound may be a diacetylene compound, i.e. a compound comprising a diacetylene moi-ety

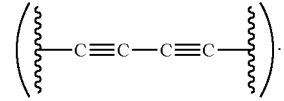

Diacetylene compounds are well known to a skilled person as compounds capable of forming colour. Upon exposure to a stimulus, diacetylene compounds typically polymerise and display colour. Typical diacetylene com-pounds are disclosed for this purpose in WO 2012/114121, the content of which is incorporated herein by reference. Suitable examples are also taught in WO2009/093028, WO2010/001171, WO2010/029329, and WO2013/068729, the content of each of which is incorporated herein by reference. Known methods of synthesis of diacetylene com-pounds include the formation of a reactive acid chloride and subsequent addition of an amine or alcohol, or the formation of a mixed anhydride and subsequent reactions with an amine or alcohol. For the diacetylene compounds disclosed herein, such syntheses may also include the installation of a protecting group P.

Diacetylene compounds are typically capable of displaying multiple colours. In the context of the present invention, it will be appreciated that following application of a composition according to the first, second and third aspects of the present invention to a substrate, a stimulus such as UV radiation, may typically be applied to effect an initial first colour formation by the diacetylene compound. Near-infrared or mid-infrared radiation may then be applied to effect formation of a second colour of the diacetylene compound.

It will be appreciated by a skilled person that prior to this initial first colour formation, certain diacetylene compounds (for example, diacetylene compounds of formulas (I) and (II)) may need to be preferentially "activated" (i.e. made capable of forming colour) prior to exposure to the stimulus affecting formation of the initial first colour of the diacetylene compound (e.g. UV radiation). This enables formation of colour by the diacetylene compound to be possible. "Activation" is the process of making the diacetylene compound capable of forming colour, i.e. changing it from an unactivated form (incapable of forming colour) to an activated form (capable of forming colour). If required, activation can be facilitated by exposure of the diacetylene compound to an activation temperature. It will be appreciated by a skilled person that this activation may take place prior to the exposure to the stimulus to form the first initial colour, or alternatively, the diacetylene compound may be activated during this exposure. Preferably, the activation takes place prior to the exposure to the stimulus to effect formation of the first initial colour. If the activation takes place prior to the exposure to the stimulus to form the first initial colour, the activation temperature is a temperature between ambient temperatures (10 to 35° C.) and the decomposition temperature of the diacetylene compound. The activation temperature may be from 40 to 150° C. Preferably, the activation temperature is from 60 to 140° C., such as from 70 to 140° C. The diacetylene compound may be exposed to the activation temperature using any suitable means, including radiation source(s) such as laser source(s). The radiation may be selected from visible light with a wavelength of from 400 to 700 nm, infrared radiation with a wavelength of from 700 nm to 1 mm, and near-infrared radiation with a wavelength of from 780 to 1600 nm. The fluence of the laser source(s) may be varied as discussed below. The diacetylene compound may also be exposed to the activation temperature using a conductive temperature source, including but not limited to: sources of steam and hot air, lamps, heat tunnels, LED(s), thermal print heads, thermal conductors, hot liquids, hotplates and heated substrates.

The colour-forming compound may be a diacetylene compound having the following formula (I):

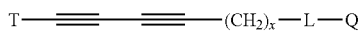
(I)

T━━━━━━(CH$_2$)$_x$━L━Q wherein x is from 2 to 12, preferably 2 to 10;
L is selected from an amide having the formula

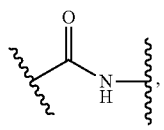 [SMILES: *NC(*)=O]

and an ester having the formula

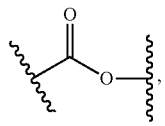

formula preferably L is an amide having the formula

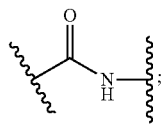

Q is selected from a $C_{1-20}$ alkyl group and a $C_{3-18}$ cycloalkyl group, preferably Q is selected from cyclopropyl and a —(CH$_2$)$_y$—CH$_3$ linear alkyl chain, y being selected from 1 to 20, preferably 5 to 19, and more preferably 5 to 17; and T is selected from hydrogen, a $C_{1-20}$ alkyl group, and —(CH$_2$)$_x$-L-Q, wherein x, L and Q are as defined above, preferably T is selected from hydrogen, a —(CH$_2$)$_y$—(CH$_3$) linear alkyl chain wherein y is as defined above, and —(CH$_2$)$_x$-L-Q, wherein x, L and Q are as defined above.

It will be appreciated by a skilled person that the diacetylene compound of formula (I) may be either symmetrical or unsymmetrical, i.e. T is —(CH$_2$)$_x$-L-Q and the values of x, L and Q are the same as those on the other side of the diacetylene moiety (symmetrical), or T is hydrogen, a $C_{1-20}$ alkyl group, or —(CH$_2$)$_x$-L-Q and the values of x, L and Q are not the same on both sides of the diacetylene moiety (unsymmetrical). Preferably, T is —(CH$_2$)$_x$-L-Q and the values of x, L and Q are the same on both side of the diacetylene moiety, such that the diacetylene compound of formula (I) is symmetrical.

Preferably, the colour-forming compound is a diacetylene compound having the following formula (II):

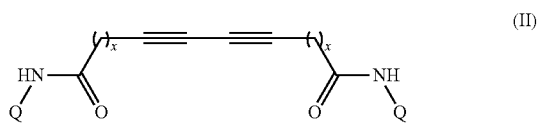
(II)

wherein x is from 2 to 12, preferably 2 to 10; and
Q is selected from cyclopropyl and a —(CH$_2$)$_y$(CH$_3$) linear alkyl chain wherein y is selected from 1 to 20, preferably 5 to 19, and more preferably 5 to 17.

Examples of suitable diacetylene compounds include, but are not limited to the following: N1,N22-dioctadecyldocosa-10,12-diynediamide, N1,N22-dihexadecyldocosa-10-12-diynediamide, N1,N22-ditetradecyldocoda-10,12-diynediamide, N1,N22-didodecyldocosa-10,12-diynediamide, N1,N22-didecyldocosa-10,12-diynediamide, N1,N22-dioctyldocosa-10,12-diynediamide, N1,N22-dihexyldocosa-10,12-diynediamide, N1,N22-dicyclopropyldocosa-10,12-diynediamide.

Preferably, the diacetylene compound is a diacetylene compound selected from N1,N22-dioctadecyldocosa-10,12-diynediamide, N1,N22-dihexadecyldocosa-10,12-diynediamide, N1,N22-ditetradecyldocosa-10,12-diynediamide, N1,N22-didodecyldocosa-10,12-diynediamide, and N1,N22-dicyclopropyldocosa-10,12-diynediamide.

Alternatively, the colour-forming compound may be a diacetylene compound comprising a protecting group.

By the term "protecting group" is meant, any cleavable organic chemical moiety that can be cleaved/removed from the diacetylene compound when exposed to certain conditions, including but not limited to: acid, base, heat, hydrogenation, radiation, and reduction. Without being bound by theory, it is understood by the present inventors that, in the context of the present invention, the protecting group is cleaved from the diacetylene compound upon exposure to the near-infrared or mid-infrared radiation. It is not necessarily the case that all of the protecting groups are cleaved (of the monomers and polymer of the diacetylene compound as defined above). The protecting group according to the present invention is therefore considered to be cleavable upon exposure to near-infrared or mid-infrared radiation.

Examples of suitable protecting include, but are not limited to: alkyl and aryl oxycarbonyl groups selected from tert-butyloxycarbonyl (BOC), 2,4-dimethylpent-3-yloxycarbonyl (DOC), dioctyl(((docosa-10,12-diynedioyl)bis(azanediyl))bis(ethane-2,1-diyl))dicarbamate (SOC), 9-fluorenylmethyl oxycarbonyl and benzyl oxycarbonyl; benzoyl; carboxybenzyl; and allyloxycarbonyl; cycloalkyls such as cyclododecane and cyclooctane; amide groups such as acetamide and trifluoroacetamide; phthalimide; triphenylmethyl; benzylidene; and p-toluenesulfonyl.

The colour-forming compound may be a diacetylene compound having the following formula (III):

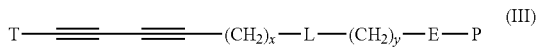

wherein x is from 2 to 12, preferably 2 to 10;
L is selected from an amide having the formula:

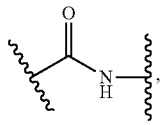 [SMILES: *NC(*)=O]

and an ester having the formula

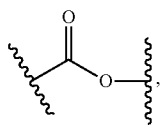 [SMILES: *OC(*)=O]

preferably L is an amide having the formula

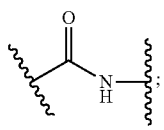 [SMILES: *NC(*)=O]

y is from 0 to 10, preferably 0 to 8, and more preferably 0 to 6;
E may be absent or present, and when present, E is selected from NH, O, and $CH_2$; preferably E is NH;

P is a protecting group; preferably, P is selected from an alkyl and aryl oxycarbonyl groups selected from tert-butyloxycarbonyl (BOC), 2,4-dimethylpent-3-yloxycarbonyl (DOC), dioctyl(((docosa-10,12-diynedioyl)bis(azanediyl))bis(ethane-2,1-diyl))dicarbamate (SOC), 9-fluorenylmethyl oxycarbonyl and benzyl oxycarbonyl; benzoyl; carboxybenzyl; and allyloxycarbonyl; cycloalkyls such as cyclododecane and cyclooctane; amide groups such as acetamide and trifluoroacetamide; phthalimide; triphenylmethyl; benzylidene; and p-toluenesulfonyl; more preferably P is an alkyl or aryl oxycarbonyl group or a cycloalkyl, more preferably P is selected from tert-butyloxycarbonyl (BOC), benzoyl, carboxybenzyl, cyclododecane, cyclooctane, 9-fluorenylmethyl oxycarbonyl, 2,4-dimethylpent-3-yloxycarbonyl (DOC), and dioctyl(((docosa-10,12-diynedioyl)bis(azanediyl))bis(ethane-2,1-diyl))dicarbamate (SOC), more preferably, P is an alkyl or aryl oxycarbonyl group, and most preferably P is selected from tert-butyloxycarbonyl (BOC), 9-fluorenylmethyl oxycarbonyl, benzoyl, carboxybenzyl, 2,4-dimethylpent-3-yloxycarbonyl (DOC), and dioctyl(((docosa-10,12-diynedioyl)bis(azanediyl))bis(ethane-2,1-diyl))dicarbamate (SOC); and T is selected from hydrogen, a —$(CH_2)_x(CH_3)$ linear alkyl chain, wherein x is defined as above, and —$(CH_2)_x$-L-$(CH_2)_y$-E-P, wherein x, y, L, E and P are defined as above.

It will be appreciated by a skilled person that the diacetylene compound of formula (III) can be either symmetrical or unsymmetrical, i.e. T is —$(CH_2)_x$-L-$(CH_2)_y$-E-P and the values of x, y, L, E and P are the same as those on the other side of the diacetylene moiety (symmetrical), or T is hydrogen, a —$(CH_2)_x(CH_3)$ linear alkyl chain, or —$(CH_2)_x$-L-$(CH_2)_y$-E-P and the values of x, y, L, E and P are different to those on the other side of the diacetylene moiety (unsymmetrical). Preferably, the diacetylene compound of formula (III) is symmetrical.

Preferably, the colour-forming compound is a diacetylene compound having the following formula (IV):

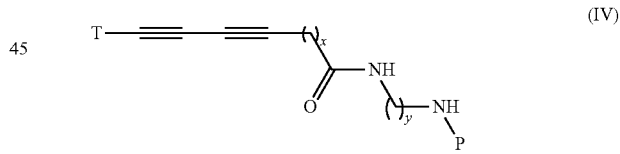

wherein x is from 2 to 10, y is from 0 to 6, P is selected from tert-butyloxycarbonyl (BOC), benzoyl, 9-fluorenylmethyl oxycarbonyl, carboxybenzyl, cyclodecane, cyclooctane, 2,4-dimethylpent-3-yloxycarbonyl (DOC) and dioctyl(((docosa-10,12-diynedioyl)bis(azanediyl))bis(ethane-2,1-diyl))dicarbamate (SOC), and T is —$(CH_2)_x$-L-$(CH_2)_y$-E-P and the values of x, y, L, E and P are the same as those on the other side of the diacetylene moiety, i.e. the diacetylene compound of formula (IV) is symmetrical.

Preferably, the diacetylene compound is selected from di-tert-butyl 2,2'-(tetradeca-6,8-diynedioyl)bis(hydrazine-1-carboxylate), di-tert-butyl(((docosa-10,12-diynedioyl)bis(azanediyl))bis(ethane-2,1-diyl))dicarbamate, di-tert-butyl 2,2'-(docosa-10,12-diynedioyl)bis(hydrazine-1-carboxylate), dibenzyl 2,2'-(docosa-10,12-diynedioyl)bis(hydrazine-1-carboxylate), N'1,N'22-dibenzoyldocosa-10,12- diynedihydrazide, tert-butyl 2-(pentacosa-10,12-diynoyl) hydrazine-1-carboxylate, N1,N22-dicyclodecyldocosa-10, 12-diynediamide and di-tert-butyl(((docosa-10,12-diynedioyl)bis(azanediyl))bis(hexane-6,1-diyl)) dicarbamate.

Keto Acid Compound

The colour-forming compound may be a keto acid compound.

By the term "keto acid compound" is meant a compound having a carboxylic acid group and a ketone group. In some instances, the ketone group is hydrated.

The colour-forming compound may be a keto acid compound of formula (V):

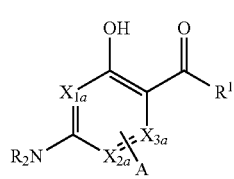

(V)

wherein $X_{1a}$, $X_{2a}$, and $X_{3a}$ are independently selected from C, N, B and S;

the two R groups may be the same or different, and are independently selected from: hydrogen, $C_{1-18}$alkyl; $C_{6-12}$aryl optionally substituted with $C_{1-18}$ alkoxy, —CN, —CF$_3$, —NO$_2$, halogen, or $C_{1-18}$ alkyl; halogen; —NO$_2$, —CF$_3$; —COR$^3$; —NR$^3_2$; —CN; —SR$^3$; —COR$^3$; —CO$_2$R$^3$; and —CONR$^3_2$; wherein R$^3$ is selected from an alkali metal; hydrogen; $C_{1-18}$alkyl; and $C_{6-12}$ aryl optionally substituted with $C_{1-18}$ alkoxy, —CN, —CF$_3$, —NO$_2$, halogen, or $C_{1-18}$ alkyl; or both R groups, together with the nitrogen atom to which they are attached, join together to form a cyclic amino group, wherein the cyclic amino group is optionally substituted with $C_{1-18}$ alkoxy, —CN, —CF$_3$, —NO$_2$, halogen, or $C_{1-18}$ alkyl.

A may be the same as or different to B' (defined below), and is independently selected from: hydrogen; $C_{1-18}$alkyl; $C_{6-12}$ aryl optionally substituted with $C_{1-18}$ alkoxy, —CN, —CF$_3$, —NO$_2$, halogen, or $C_{1-18}$ alkyl; a heterocyclic ring; a heteroaryl; halogen; —NO$_2$; —CF$_3$; —OR$^3$; —NR$^3_2$; —CN; —SR$^3$; —COR$^3$; —CO$_2$R$^3$; —CONR$^3_2$; wherein R$^3$ is selected from an alkali metal; hydrogen; $C_{1-18}$alkyl; and $C_{6-12}$ aryl optionally substituted with $C_{1-18}$ alkoxy, —CN, —CF$_3$, —NO$_2$, halogen, or $C_{1-18}$ alkyl; and R$^1$ is selected from

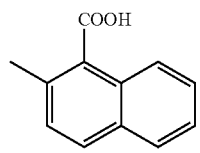 and 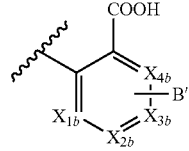

wherein $X_{1b}$, $X_{2b}$, $X_{3b}$ and $X_{4b}$ are independently selected from C, N, B and S; and B' is the same or different to A and is independently selected from hydrogen; $C_{1-18}$ alkyl; $C_{6-12}$ aryl optionally substituted with $C_{1-18}$ alkoxy, —CN, —CF$_3$, —NO$_2$, halogen, or $C_{1-18}$ alkyl; a heterocyclic ring; a heteroaryl; halogen; —NO$_2$; —CF$_3$; —OR$^3$; —NR$^3_2$; —CN; —SR$^3$; —COR$^3$; —CO$_2$R$^3$; —CONR$^3_2$; wherein R$^3$ is selected from an alkali metal; hydrogen; $C_{1-18}$alkyl; and $C_{6-12}$ aryl optionally substituted with $C_{1-18}$ alkoxy, —CN, —CF$_3$, —NO$_2$, halogen, $C_{1-18}$ alkyl, hydroxyl (—OH), or —NR$_2$ wherein R is as defined above.

It will be appreciated that A and B' may constitute a substituent at a single position on the benzene ring to which each of A and B' relates or A and B' may constitute multiple independently selected substituents at any of the available positions on the benzene ring to which each of A and B' relates. For example, the benzene ring to which B' relates may be substituted with a single substituent or up to 4 independently selected substituents.

Preferably, the keto acid compound is selected from formula (VI):

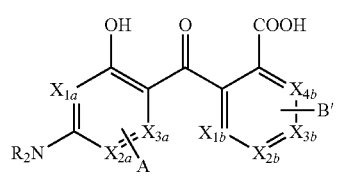

(VI)

wherein $X_{1a}$, $X_{2a}$, $X_{3a}$, $X_{1b}$, $X_{2b}$, $X_{3b}$ and $X_{4b}$, R, A and B' are as described above for formula (V).

Preferably, the keto acid compound is selected from formula (VII):

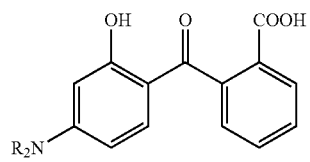

(VII)

wherein R is as described above for formula (V). Preferably, the two R groups are the same and are selected from $C_{1-18}$alkyl; and $C_{6-12}$aryl optionally substituted with $C_{1-18}$ alkoxy, —CN, —CF$_3$, —NO$_2$, halogen, or $C_{1-18}$ alkyl. More preferably, the two R groups are the same and $C_{1-18}$ alkyl, more preferably $C_{1-6}$ alkyl. Preferably, B' is independently selected from hydrogen; —NO$_2$ and halogen, more preferably, hydrogen and chlorine, and most preferably hydrogen.

Preferably, the keto acid compound is selected from 2-(4-(dimethylamino)-2-hydroxybenzoyl)benzoic acid, 2-(4-(dibutylamino)-2-hydroxybenzoyl)benzoic acid, 2-(4-(diethylamino)-2-hydroxybenzoyl)benzoic acid, and 2,3,4, 5-tetrachloro-6-(4-(diethylamino)-2-hydroxybenzoyl)benzoic acid. More preferably, 2-(4-(dimethylamino)-2-hydroxybenzoyl)benzoic acid, 2-(4-(dibutylamino)-2-hydroxybenzoyl)benzoic acid, and 2-(4-(diethylamino)-2-hydroxybenzoyl)benzoic acid.

The keto acid compounds of formulas (V) to (VII) are commercially available, for example, they can be sourced from Chameleon Speciality Chemicals Limited.

It is noted that in one embodiment, the keto acid compound may be in the form of a 'dime, whereby B' denotes a —CO$_2$R$^3$ group (where R$^3$ is hydrogen such that the benzene ring carries two carboxyl groups) and also, an independently selected —COR$^3$ group, where R$^3$ is a $C_{6-12}$ aryl substituted with hydroxyl (—OH) and NR$_2$, wherein R is as defined above for formula (V). Preferably, the —CO$_2$R$^3$ group (where $R^3$ is hydrogen such that the benzene ring carries two carboxyl groups) is at $X_{2b}$ and the —$COR^3$ group is at $X_{3b}$.

When the colour-forming compound is a leuco dye or keto acid compound, the colour-forming compound is accompanied in the composition by an acid-generating agent.

Without being bound by theory, it is considered that the acid-generating agent and the leuco dye or keto acid compound interact to achieve colour formation. The acid-generating agent is present in the composition to facilitate a pH change through generation of acid upon application of the appropriate near-infrared or mid-infrared radiation. This acid generation facilitates the formation of colour by the colour-forming compound. By "acid" is meant any molecular entity or chemical species capable of donating a hydrogen (proton) or capable of forming a covalent bond with an electron pair. It will further be appreciated by a skilled person that the transfer of heat from the heat transfer agent is to both the acid-generating agent and the colour-forming compound.

Suitable acid-generating agents include any suitable commercially available or chemically synthesisable acid-generating agents. Suitable acid-generating agents include, but are not limited to the following: thermal acid-generating agents (TAGs) including those based on amine salts of borobenzilate and tri-n-butylammonium borodisalicylate such as tri-n-butylammonium-4,4'-dioxo-4H,4'H-2,2'-spirobi[benzo[d][1,3,2]dioxaborinin]-2-uide, as well as 4-hydroxy-4'-isopropoxydiphenylsulfone, (2,4-dihydroxyphenyl)phenylmethanone, 3-(3-tosylureido)phenyl-4-methylbenzenesulfonate, 1,1,1-tris(4-hydroxyphenyl)ethane, propyl-3,4,5-trihydroxybenzoate and 4,4'-methanediyldiphenol.

It will be understood by a skilled person that the selection of the acid-generating agent is dependent upon the particular leuco dye or keto acid compound utilised in the composition.

The composition according to the first, second or third aspect of the present invention may comprise more than one colour-forming compound.

If more than one colour-forming compound is present in the composition, it will be appreciated that the colour-forming compounds will be different. By "different" with respect to the colour-forming compounds is meant that the colour-forming compounds are selected from different colour-forming compound groups e.g. leuco dye, oxyanion of a multivalent metal, diacetylene compound, or keto acid compound as defined above, or are selected so as to be different compounds in the same colour-forming compound groups, e.g. two different leuco dyes.

It will be appreciated by a skilled person that if more than one colour-forming compound is present in the composition, two colour-forming compounds cannot be selected so as to both be accompanied by an acid-generating agent, i.e. the compound may comprise only one acid-generating agent. If two colour-forming compounds are present, they will be selected such that only one requires an acid-generating agent, or in certain instances, the acid-generating agent associated with one of the two colour-forming compounds will also interact with the other of the two colour-forming compounds as discussed above.

It will be appreciated that if a combination of colour-forming compounds is present in the composition, the colours of the colour-forming compounds will typically be different in colour.

The heat transfer agent may be any suitable compound capable of facilitating the transfer of heat from the near-infrared radiation absorbing compound of the composition to the colour-forming compound.

It has surprisingly and advantageously been found that the improved colour formation demonstrated by the composition of the present invention may result from the selection of a specific heat transfer agent. This is embodied by the third aspect of the present invention, but is also applicable to the first and second aspects. The heat transfer agent may be a metal oxide, a metal pyrophosphate or a metal phosphate of the following metals: iron, aluminium, zirconium, titanium or combinations thereof. Preferably, the heat transfer agent is a metal oxide, a metal pyrophosphate or a metal phosphate of the following metals: iron, aluminium, zinc, zirconium, titanium, or combinations thereof. It will be appreciated by a skilled person that references to metal oxides, metal pyrophosphates or metal phosphate are to be interpreted as also covering the hydrates of any of the given metal oxides, metal pyrophosphates or metal phosphates. The heat transfer agent may be selected from: iron (III) pyrophosphate hydrate, aluminium zinc oxide, zirconium (IV) oxide, aluminium oxide, iron phosphate dihydrate and titanium dioxide. More preferably, the heat transfer agent is selected from: iron (III) pyrophosphate hydrate, aluminium zinc oxide, zirconium (IV) oxide, aluminium oxide, zinc oxide, iron phosphate dihydrate and titanium dioxide. Even more preferably, the heat transfer agent is a metal oxide. The heat transfer agent may be a metal oxide of: iron, aluminium, zirconium and titanium, or combinations thereof. Even more preferably, the heat transfer agent is a metal oxide of: iron, aluminium, zinc, zirconium and titanium, or combinations thereof. The heat transfer agent may be selected from zirconium (IV) oxide, aluminium oxide, and titanium dioxide. Even more preferably, the heat transfer agent is selected from aluminium zinc oxide, zirconium (IV) oxide, aluminium oxide, zinc oxide and titanium dioxide. Most preferably, the heat transfer agent is zirconium (IV) oxide.

It will be appreciated by the skilled person that the heat transfer agent requires a high melting temperature (melting point) or decomposition temperature. Preferably, the heat transfer agent has a melting temperature or decomposition temperature greater than the colour-forming compound. It will be appreciated by the skilled person that the heat transfer agent may be selected depending upon the colour-forming compound and particular substrate utilised. Preferably, the heat transfer agent has a melting temperature or decomposition temperature of 300° C. or more, such as 500° C. or more, or 1,000° C. or more, or even 2,000° C. or more. Preferably, the colour-forming compound has a melting temperature or decomposition temperature of 50 to 300° C., such as from 100 to 300° C.

Melting temperatures (melting points) or decomposition temperatures may be measured using any suitable method. Suitable measuring methods will be well known to those skilled in the art. Preferably, the melting temperature or decomposition temperature is measured using melting point tubes (capillary method), or using differential scanning calorimetry (DSC).

It will further be appreciated by a skilled person that the heat transfer agent requires a high heat capacity. By "heat capacity" is meant the amount of heat supplied to a given mass of material to produce a unit change in temperature. Preferably, the heat transfer agent has a heat capacity greater than the binder and carrier components utilised in the composition. Preferably, the heat transfer agent has a heat capacity of 250 J/Kg·K (Joule per Kg Kelvin) or more, more preferably 50 to 1,000 J/Kg·K, such as from 250 to 800

J/Kg·K. Most preferably, the heat transfer agent has a heat capacity of from 400 to 600 J/Kg·K.

The heat transfer agent may be white, off-white or colourless. In some instances, the heat transfer agent may display a pale, light or low colour. Preferably, the heat transfer agent is white, off-white or colourless. It will be appreciated by a skilled person that this means that the heat transfer agent has little effect on the colour of the composition, such that following application of the composition to a substrate prior to exposure to near-infrared or mid-infrared radiation, as well as following application of the near-infrared or mid-infrared radiation to certain part(s) of the composition, the background colour (the part(s) of the composition not exposed to radiation) of the composition has reduced or low colour. This reduced or low background colour is in contrast to the strong colour of the colour or image formed on the substrate by the application of the near-infrared or mid-infrared radiation. The impact of the heat transfer agent on background colouration of the composition can be demonstrated by measurement of ΔE values using an X-Rite eXact or SpectroEye spectrophotometer. For example, ΔE may be calculated from L*a*b* measurements of the composition following application to a substrate, and L*a*b* measurements for a standard white tile. Further details are provided in the Examples section detailed below.

The heat transfer agent is present in the composition of the present invention as solid particles, specifically solid particles dispersed throughout the composition. The heat transfer agent is introduced into the composition as solid particles and remains dispersed in the composition as said solid particles. The advantageous transfer of heat from the near-infrared absorbing compound to the colour-forming compound of the composition of the present invention is achieved by the transfer of heat across the network of the distinct solid particles of the heat transfer agent present in the composition. The solid particles of the heat transfer agent are dispersed throughout the composition. Specifically, the solid particles of the heat transfer agent are dispersed throughout the one or more binder and carrier component(s) of the composition, and are thus capable of transferring heat from the near-infrared absorbing compound to the colour-forming compound of the composition. It will be appreciated by a skilled person that such heat transfer cannot be facilitated by materials in ionic, dissociated or dissolved forms within a composition, for example, ionic, dissociated or dissolved materials in a liquid, vapour or gas phase.

Preferably, the heat transfer agent has a D50 particle size distribution value of 5 μm or less. D50 particle size distribution is the mean diameter or mean value of the particle size distribution, i.e. the particle diameter at 50% in the cumulative distribution. More preferably, the heat transfer agent has a D50 particle size distribution value of from 0.1 to 4 μm, such as from 0.1 to 3 μm, and most preferably 0.5 to 2 μm.

D50 particle size distribution is measured using a Malvern Mastersizer according to ISO standard 13320:2009.

Preferably, the heat transfer agent has a surface area of 3 to 25 m²/g (square metres per gram). More preferably, the heat transfer agent has a surface area of 10 to 25 m²/g, and most preferably 15 to 25 m²/g.

Surface area is measured using a Malvern Mastersizer according to ISO standard 13320:2009 which calculates the surface area from particle size distribution data.

It has further surprisingly and advantageously been found that the improved colour formation demonstrated by the composition of the present invention may result from the selection of a specific ratio of the near-infrared radiation absorbing composition to heat transfer agent in the composition. This is embodied by the first aspect of the present invention, but is also applicable to the second and third aspects.

The ratio of the near-infrared radiation absorbing compound to the heat transfer agent in the composition may be 1:1 to 1:100. Preferably, the ratio of the near-infrared radiation absorbing compound to the heat transfer agent in the composition is 1:1 to 1:50, such as 1:1 to 1:20. More preferably, the ratio of the near-infrared radiation absorbing compound to the heat transfer agent in the composition is 1:1.5 to 1:18. More preferably, the ratio of the near-infrared radiation absorbing compound to the heat transfer agent in the composition is 1:1.7 to 1:15, such as from 1:4 to 1:15, or even 1:5 to 1:15. It will be appreciated by a skilled person that such ratios enable efficient transfer of heat from the near-infrared radiation absorbing compound to the colour-forming compound of the composition via the heat transfer agent.

It has further surprisingly and advantageously been found that the improved colour formation demonstrated by the composition of the present invention may result from the selection of specific amounts of the near-infrared radiation absorbing compound and the heat transfer agent in the composition. This is embodied by the second aspect of the present invention, but is also applicable to the first and third aspects.

The near-infrared radiation absorbing compound may be present in the composition in any suitable amount. Preferably, the composition comprises from 0.1 to 3.5 wt %, such as from 0.2 to 1.75 wt %, or even from 0.5 to 1.5 wt %, such as from 0.5 to 1 wt % of the near-infrared radiation absorbing compound.

In the context of the present invention, for wt % refers to weight percentage.

The heat transfer agent may be present in the composition in any suitable amount. Preferably, the composition comprises from 1 to 15 wt %, such as from 2 to 12 wt %, or 2 to 10 wt %, or even from 2.5 to 10 wt %, or 3 to 10 wt %, or 5 to 10 wt % of the heat transfer agent.

The near-infrared absorbing compound may be present in an amount of 0.1 to 3.5 wt % of the composition, and the heat transfer agent may be present in an amount of 1 to 15 wt %. Preferably, the NIR-absorbing compound may be present in an amount of 0.2 to 1.75 wt % of the composition, and the heat transfer agent may be present in an amount of 2 to 12 wt % such as 2 to 10 wt %. More preferably, the NIR-absorbing compound may be present in an amount of 0.5 to 1.5 wt % such as 0.5 to 1 wt %, and the heat transfer agent may be present in an amount of 2 to 10 wt %, such as 2.5 to 10 wt %, or 3 to 10 wt %, or 5 to 10 wt %.

The colour-forming compound may be present in the composition in any suitable amount. Preferably, the composition comprises from 1 to 40 wt %, such as from 5 to 25 wt %, or even from 5 to 15 wt % of the colour-forming compound.

If required, the acid-generating agent relating to the colour-forming compound may be present in the composition in any suitable amount. Preferably, the composition comprises from 3 to 35 wt %, such as from 10 to 20 wt % of the acid-generating agent.

The composition may further comprise one or more binder and carrier component. Previously only insulating materials such as insulating polymers having high glass transition temperatures (Tg) and high minimum film forming temperatures (MFFT) could be utilised as binder and carrier components. However, it has been surprisingly and advantageously found by that a broader range of binder and carrier components can be utilised in the composition of the present invention, including binder and carrier components having lower glass transition temperatures (Tg) and/or lower minimum film forming temperatures (MFFT). This enables the composition according to the present invention to be utilised with a broader range of substrates, including with heat-sensitive substrates, such as heat-sensitive polymer foils and films.

The one or more binder and carrier component may have any suitable glass transition temperature (Tg). It will be appreciated by a skilled person that the selection of the one or more binder and carrier component is dependent upon at least the substrate to which the composition is to be applied.

The one or more binder and carrier component may have a Tg of from −60 to 120° C., such as from −10 to 120° C., or from 20 to 115° C., or even from 40 to 110° C. Glass transition temperatures within this range are appropriate for substrates other than polymer foils and films, for example, for paper substrates.

The one or more binder and carrier component may have a Tg of from −60 to 40° C., such as from −55 to 30° C., or even from −50 to 25° C. Glass transition temperatures within this range are appropriate for polymer foil and film substrates, including heat-sensitive polymer foil and film substrates.

The Tg of the one or more binder and carrier component may be measured by any suitable method. Methods to measure Tg will be well known to a skilled person. Herein, the Tg is measured using differential scanning calorimetry (DSC). Typically, this is according to ASTM D3418 and/or ASTM E1356 and/or ISO 11357.

The one or more binder and carrier component may have any suitable minimum film forming temperature (MFFT). It will be appreciated by a skilled person that the selection of the one or more binder and carrier component is dependent upon at least the substrate to which the composition is to be applied.

The one or more binder and carrier component may have a MFFT of from −10 to 120° C., such as from −10 to 115° C., or even from 40 to 110° C. Minimum film forming temperatures within this range are appropriate for substrates other than polymer foils and films, for example, for paper substrates.

The one or more binder and carrier component may have a MFFT of from −10 to 40° C., such as from −10 to 35° C., or from −5 to 30° C., or even from −5 to 25° C. Minimum film forming temperatures within this range are appropriate for polymer foil and film substrates, including heat-sensitive polymer foil and film substrates.

The MFFT may be measured by any suitable method. Methods to measure the MFFT will be well known to a skilled person. Herein, the MFFT is measured according to ISO 2115:1996.

Examples of suitable one or more binder and carrier components include, but are not limited to the following: polymeric binders such as acrylic polymers, styrene polymers, styrene-acrylic copolymers and hydrogenated products thereof; vinyl polymers such as polyvinyl alcohol, polyvinyl acetate, polyvinyl chloride and polyvinyl butyral; polyolefins and hydrogenated or epoxidised products thereof; aldehyde-containing polymers; epoxide-containing polymers; polyamides; polyesters; polyurethanes; sulphone-containing polymers; natural products and derivatives thereof; cellulose-based polymers such as nitrocellulose, and combinations thereof. The one or more binder and carrier component may be selected from, but not limited to: polymeric binders such as acrylic polymers, and styrene polymers; vinyl polymers such as polyvinyl alcohol, polyvinyl acetate, polyvinyl chloride and polyvinyl butyral; polyolefins and hydrogenated or epoxidised products thereof; aldehyde-containing polymers; epoxide-containing polymers; polyamides; polyesters; polyurethanes; sulphone-containing polymers; natural products and derivatives thereof; cellulose-based polymers such as nitrocellulose, and combinations thereof Preferably, the one or more binder and carrier component is selected from acrylic polymers, styrene polymers, styrene-acrylic copolymers, vinyl polymers such as polyvinyl alcohol, polyvinyl acetate, polyvinyl chloride and polyvinyl butyral, polyamides; polyurethanes; and cellulose-based polymers such as nitrocellulose; and combinations thereof. More preferably, the one or more binder and carrier component is selected from a styrene-acrylic copolymer, a cellulose-base polymer such as nitrocellulose, and polyurethane, and combinations thereof.

The one or more binder and carrier component may be present in the composition in any suitable amount. Preferably, the composition comprises from 5 to 70 wt %, such as from 6 to 70 wt % or from 7 to 65 wt %, or even from 10 to 65 wt %, or 10 to 40 wt % of the one or more binder and carrier component.

The composition according to the first aspect of the present invention may further comprise a curable compound. Suitable curable compounds will be well known to a person skilled in the art. Examples of suitable curable compounds include, but are not limited to: any commercially available monomers, oligomers, monomer and oligomer mixtures, or photoinitiators. The curable compound may be present in the composition in any suitable amount.

The composition may further comprise an additive or combination of additives. Suitable additives will be well known to a person skilled in the art. Examples of suitable additives include, but are not limited to the following: polymers; light or energy absorbing agents; UV absorbers; surfactants; wetting agents; drying promoters; colourants such as pigments; tinting agents; fluorescent agents; plasticisers; optical brighteners; oxidising or reducing agents; stabilisers; light stabilising agents such as hindered amines; rheology modifiers such as thickening or thinning agents; humectants; adhesion promotors; acid or base scavenging agents; retarders; defoamers; antifoaming agents; and combinations thereof. Preferably, the composition comprises from 0.1 to 10 wt %, such as from 0.25 to 7.5 wt %, and more preferably, from 0.5 to 5 wt % of additives or combinations thereof.

The composition may further comprise a solvent. The composition may comprise a single solvent or a mixture of solvents. The solvent may comprise water, an organic solvent, a mixture of water and an organic solvent, or a mixture of organic solvents. Suitable organic solvents include, but are not limited to the following: alcohols such as ethanol, n-propanol, isopropanol and n-butanol; esters such as ethyl acetate, butyl acetate, and n-hexyl acetate; aromatic hydrocarbons such as benzene, toluene, xylene, and solvent naphtha 100, 150, 200; ketones such as acetone, cyclohexanone, methylisobutyl ketone, and methyl ethyl ketone; glycols such as butyl glycol; glycol ethers such as methoxypropanol, ethylene glycol monomethyl ether, ethylene glycol monobutyl ether; and combinations thereof. A skilled person will be capable of determining the appropriate solvent for use in a composition according to the first, second and third aspects of the present invention, in particular based upon the colour-forming compound present in the composition. Typically, when the colour-forming compound is an oxyanion of a multivalent metal, the solvent may be water-based (comprising only water, no organic solvent) or solvent-based (comprising only organic solvent, no water). Typically, when the colour-forming compound is a leuco dye, the solvent is water-based. Preferably, the solvent is present in the composition in amounts of from 0.1 to 60 wt %, such as from 10 to 50 wt %, or even from 30 to 45 wt %. It will be appreciated that the amount of solvent includes all solvents present in the composition, i.e. includes any solvent of the component materials used to form the composition.

It will be appreciated by a skilled person that the print viscosity of the composition according to the present invention will vary dependent upon the printing application. For water and solvent based printing, the composition of the present invention may have a print viscosity of from 100 to 600 cP (0.1 to 0.6 pascal seconds). For UV flexographic printing, the composition of the present invention may have a print viscosity of from 6000 to 17,000 cP (6 to 71 pascal seconds). For UV offset printing, the composition of the present invention may have a print viscosity of from 90,000 to 200,000 cP (90 to 200 pascal seconds). The print viscosity is measured using a Brookfield DV2T Viscometer (no. 3 spindle (RV spindle set), speed 60 rpm, 22° C.). This print viscosity is the viscosity of the composition when it is ready for application to the substrate.

The composition of the present invention preferably comprises, in addition to the heat transfer agent, colour-forming compound and the near-infrared radiation absorbing compound, one or more carrier or binder component, an additive or combination of additives, and a solvent or combination of solvents.

The composition of the present invention is a radiation-reactive composition, such as a laser-reactive composition. The composition of the present invention is further suitable as an ink composition. The composition of the present invention is suitable for the formation of colour and single- or multi-colour images on substrates.

The composition according to the first, second or third aspect of the present invention may be applied to any suitable substrate. It will be appreciated that the contents of the composition will likely vary depending on the substrate to which the composition is to be applied.

Thus, according to a fourth aspect of the present invention, there is provided a substrate comprising the composition of the first aspect of the present invention applied thereon.

According to a fifth aspect of the present invention, there is provided a substrate comprising the composition of the second aspect of the present invention applied thereon.

According to a sixth aspect of the present invention, there is provided a substrate comprising the composition of the third aspect of the present invention applied thereon.

As discussed above, it has been surprisingly and advantageously found that the composition according to the first, second or third aspects of the present invention can be applied to heat-sensitive substrates. By "heat-sensitive substrates" is meant any substrate having a melting temperature or decomposition temperature of 200° C. or less, such as paper, or a polymer film or foil substrate having a melting temperature or decomposition temperature of 200° C. or less. Previously, without a heat transfer agent present as solid particles dispersed throughout the composition, the binder or carrier components would soften or melt upon absorption of too much heat from the near-infrared absorbing compound such that heat-sensitive substrates could not be utilised as too much heat would be transferred to them. The composition according to the present invention substantially retains and utilises the heat positively and constructively, and does not transfer it negatively or destructively to the substrate, and can thus be applied to heat-sensitive substrates.

Examples of suitable substrates to which the composition may be applied to include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; textiles; paper; corrugated paperboard, cardboard, and equivalent recycled analogues, or combinations thereof; ceramics; foodstuffs and pharmaceutical preparations; or combinations thereof, e.g. polymer lined paper or polymer impregnated paper. The polymer and recycled polymer materials may be in the form of polymer foil or film substrates.

Suitable substrates include multi-layered substrate constructions formed from the materials and substrates listed above. For example, multi-layered substrate constructions may include a paper substrate joined to a polymer foil or film substrate such as a polypropylene film to form a laminated substrate. Other multi-layered substrate constructions include two or more polymer foil or film substrates joined together, the composition being sandwiched either between the polymer foil or film substrates, or applied to the exterior thereof. It will be appreciated by a skilled person that the component substrates of the multi-layered substrate constructions will be bonded by adhesive.

Preferably, the substrate to which the composition is applied is a paper substrate or a polymer foil or film substrate. Preferably, the polymer film or foil substrate is selected from polypropylene (PP), polyethylene (PE) or polyethylene terephthalate (PET). More preferably, the polymer film or foil substrate is selected from polypropylene (PP) and polyethylene (PE).

The substrate to which the composition is applied may have a thickness of from 12 μm to 12 mm, such as from 12 μm to 1 mm, or from 20 to 500 μm, or even from 30 to 350 μm.

When the substrate is a paper substrate, the substrate to which the composition is applied may have a weight per unit are (gsm) of from 50 to 500 gsm, such as from 60 to 250 gsm and including from 80 to 200 gsm.

It will be appreciated by a skilled person that the substrate to which the composition is applied to may itself be applied to a further substrate. Examples of further substrates include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; textiles; paper; corrugated paperboard, cardboard, and equivalent recycled analogues, or combinations thereof; ceramics; foodstuffs and pharmaceutical preparations; or combinations thereof, e.g. polymer lined paper. Suitable substrates include multi-layered constructions formed from the materials and substrates listed above. The polymer and recycled polymer materials may be in the form of polymer foil or film substrates.

The composition according to the first, second or third aspect of the present invention, or substrate to which the composition has been applied to according to the fourth, fifth or sixth aspect of the present invention, may be suitable for end use as labels (adhesive or wraparound), and/or in fast-moving consumer goods; packaging such as disposable packaging including food and hot or cold beverage containers; hygiene and personal care product packaging such as shampoo bottles; cosmetic product packaging; decorative metal products; blister pack packaging; laminated pouches; and medical and diagnostic devices and associated packaging; and signage.

Preferably, the substrate comprises an adhesive layer. It will be appreciated that this adhesive layer is operable to apply the substrate to the further substrate or any other material and is therefore on an exterior surface of the substrate. The adhesive layer may cover all, substantially all, or part of the surface area of an exterior surface of the substrate. When the composition is applied to the substrate, the adhesive layer is preferably on an exterior surface of the substrate other than that to which the composition is applied.

It will be appreciated that the substrate may comprise a single or multiple layers of the composition according to the first, second or third aspect of the present invention applied thereto.

It will be appreciated that the substrate may further comprise one or more additional layers applied thereto so as to form a multi-layer construction. The multi-layer construction may comprise a substrate having a plurality of discrete layers applied thereon. This plurality of discrete layers may include a composition according to the first, second or third aspect of the present invention, and one or more additional layers. Suitable additional layers may be selected from, but are not limited to: thermal insulating layers, protective layers, primer layers, adhesion promoting layers, barrier layers, and radiation blocking layers such as a UV blocking layer, quenching layers, hindered amine light stabilisers, and combinations thereof.

Preferably, the multi-layer construction is formed of a substrate having applied thereto in the following order: a primer layer, a layer formed of the composition according to the first, second or third aspect of the present invention, and a protective layer such as an over-varnish layer. It will be appreciated by a skilled person that, as discussed above, the binder and carrier components having low Tg and low MFFT enables heat-sensitive substrates to be utilised in the multi-layer construction. In addition, the binder and carrier components having low Tg and low MFFT also advantageously enables heat-sensitive one or more additional layers, such as the primer and protective layers, to be utilised in the multi-layer construction. In the multi-layer construction, the composition of the present invention enables the heat absorbed from the near-infrared radiation to be retained in the layer of the composition according to the first, second or third aspect of the present invention such that heat-sensitive one or more additional layers as well as heat-sensitive substrates can be utilised. This broadens the uses for multi-layer constructions comprising the compositions according to the present invention. For said multi-layer constructions, the substrate may be selected from those listed above, including multi-layer substrate constructions.

The one or more additional layers of the multi-layer construction may also include a layer comprising a different colour forming compound. By "different colour forming compound" is meant that the colour-forming compound is selected from a different colour-forming compound group than the colour-forming compound(s) of the composition according to the first, second or third aspect of the present invention, or the colour forming compound is a different compound in the same colour-forming compound group as the colour-forming compound of the composition according to the first, second or third aspect of the present invention, Colour-forming compound groups are: leuco dye, oxyanion of a multivalent metal, diacetylene compound, or keto acid compound as defined above.

It will be appreciated that the layer ordering of the multi-layer construction will vary depending upon intended use. In addition, it will be appreciated that the thickness or coat weight of each of the layers will vary dependent upon their contents.

Thus, according to a seventh aspect of the present invention, there is provided a method of forming a substrate comprising applying to the substrate the composition according to the first aspect of the present invention.

According to an eighth aspect of the present invention, there is provided a method of forming a substrate comprising applying to the substrate the composition according to the second aspect of the present invention.

According to a ninth aspect of the present invention, there is provided a method of forming a substrate comprising applying to the substrate the composition according to the third aspect of the present invention.

The composition may be applied to the substrate by any suitable method. Methods of applying the composition to a substrate will be well known to a person skilled in the art. Suitable application methods include, but are not limited to the following: flexographic printing, gravure printing, screen printing, offset printing and meyer bar coating. The composition may be applied to all, substantially all or part of the surface area of an exterior surface of the substrate.

The composition may be applied on a substrate to any suitable coat weight dependent upon both the substrate to which the composition is applied and the application method. It will be appreciated by a skilled person that the coat weight of the composition on the substrate will affect the intensity of the colour formed. Preferably, the composition is applied to a coat weight of from 0.1 to 50 gsm (grams per square metre), such as from 0.1 to 25 gsm, and most preferably from 0.1 to 15 gsm.

The coat weight may be measured by any suitable method. Suitable measuring methods will be well known to those skilled in the art. Preferably, the coat weight is measured by weighing the same area of substrate with and without the composition applied thereto, and comparing the difference between the two weights.

The composition may be applied to the substrate as a single layer or as multiple layers.

The composition may be applied to the substrate as part of the plurality of discrete layers of the multi-layer construction discussed above. The composition may be applied to the substrate as an undercoat or an overcoat, on top of a primer or as a primer layer. The composition may be applied to the substrate once or multiple times. The composition may be applied to at least part, or all, of an exterior surface of the substrate.

It will be appreciated that the one or more additional layers discussed above in relation to the substrate may be applied to the substrate in the same manner as described herein in relation to the composition.

The plurality of discrete layers for the multi-layer construction discussed above may have any suitable overall coat weight. Preferably, the plurality of discrete layers individually have a coat weight as set out above in relation to the composition according to the first, second or third aspect of the present invention when applied on a substrate. Further, preferably the plurality of discrete layers have an overall coat weight (encompassing all layers) of 100 gsm or less (grams per square metre), more preferably 50 gsm or less, and most preferably 30 gsm or less. It will be appreciated by a skilled person that the overall coat weight of the plurality of discrete layers will be dependent upon the layer formation and the substrate.

Following formulation, upon application to the substrate and prior to application of the near-infrared or mid-infrared radiation, the composition according to the first, second and third aspects (and as utilised in all other aspects) of the present invention may be white, off-white or colourless. In some instances, the composition may display a pale, light or low colour. This pale, light or low colour may be caused by the presence of any of the near-infrared radiation absorbing compound, the colour-forming compound or the heat transfer agent, but typically the near-infrared absorbing compound. It will be appreciated that if displayed, this pale, light or low colour is visibly significantly less intense in colour compared to the colour formed upon application of near-infrared or mid-infrared radiation thereto, such that formation of a strong contrasting colour and/or image is achieved upon application of the near-infrared or mid-infrared radiation. It will be further appreciated that the background of the composition, i.e. the part(s) of the composition that is not exposed to the near-infrared or mid-infrared radiation will remain white, off-white or colourless, or in some instances, display a pale, low or light colour as discussed above.

The composition according to the first, second or third aspects (and as utilised in all other aspects) of the present invention may be clear, transparent or translucent upon formulation, application to the substrate and prior to the application of near-infrared or mid-infrared radiation.

The application of the composition to the substrate enables colour and an image to be formed on the substrate.

Thus, according to a tenth aspect of the present invention, there is provided a method of forming colour on a substrate comprising the composition according to the first aspect of the present invention applied thereon, the method comprising exposing the composition to near-infrared or mid-infrared radiation to form colour on the substrate.

According to an eleventh aspect of the present invention, there is provided a method of forming colour on a substrate comprising the composition according to the second aspect of the present invention applied thereon, the method comprising exposing the composition to near-infrared or mid-infrared radiation to form colour on the substrate.

According to a twelfth aspect of the present invention, there is provided a method of forming colour on a substrate comprising the composition according to the third aspect of the present invention applied thereon, the method comprising exposing the composition to near-infrared or mid-infrared radiation to form colour on the substrate.

According to a thirteenth aspect of the present invention, there is provided a method of forming an image on a substrate comprising the composition according to the first aspect of the present invention applied thereon, the method comprising exposing the composition to near-infrared or mid-infrared radiation to form an image on the substrate.

According to a fourteenth aspect of the present invention, there is provided a method of forming an image on a substrate comprising the composition according to the second aspect of the present invention applied thereon, the method comprising exposing the composition to near-infrared or mid-infrared radiation to form an image on the substrate.

According to a fifteenth aspect of the present invention, there is provided a method of forming an image on a substrate comprising the composition according to the third aspect of the present invention applied thereon, the method comprising exposing the composition to near-infrared or mid-infrared radiation to form an image on the substrate.

By the term "colour" and like terms used herein, is meant the colours and hues of the visible light colour spectrum, i.e. red, orange, yellow, blue, green and violet, in addition to black, brown, turquoise, purple, pink, cyan, and magenta, and mixtures thereof. Both primary and secondary colours are encompassed. In the context of the present invention, the term may also be used to describe differing shades of each of the colours of the visible light colour spectrum, in addition to magenta, cyan, pink, purple, turquoise, brown and black.

The term "image" incorporates, but is not limited to: logos, codes such as machine-readable linear barcodes, 2D Datamatrix codes, QR codes and Digimarc codes and marks, graphics, figures, pictures, symbols, and text. The term further incorporates both single- and multi-coloured images. It will be appreciated that in the context of the present invention, for both single- and multi-coloured images, it is the manipulation of the composition comprising the colour-forming compound that facilitates the formation of an image. The image formed will be human and/or machine readable, and can be used for coding and marking, tagging tracking and tracing, and late-stage customisation or personalisation purposes. The code can be composed of for example alphanumeric text or symbol fonts to indicate expiry dates and/or batch or lot codes. The code may also be graphical and for example, capable of being scanned or verified with a device such as a barcode scanner, verifier or using a smartphone camera or app. In the context of the present invention, the image will be a contrasting image. By "contrasting image" is meant that the image formed by the composition on a substrate is distinct and easily discernible from the background of the composition, i.e. the part of the composition, which has not been exposed to near-infrared or mid-infrared radiation, or the colour of the substrate if visible through the composition following application to the substrate.

When the colour formed is black or the image formed is black in colour, or a shade or tint thereof, including greyscale, the optical density of the colour or image may be evaluated by measurement of an optical density black (ODB) value. When the colour formed is red or the image formed is red in colour or a shade or tint thereof, the optical density of the colour or image may be evaluated by measurement of an optical density magenta (ODM) value. When the colour formed is blue or the image formed is blue in colour or a shade or tint thereof, the optical density of the colour or image may be evaluated by measurement of an optical density cyan (ODC) value. When the colour formed is yellow or the image formed is yellow in colour or a shade or tint thereof, the optical density of the colour or image may be evaluated by measurement of an optical density yellow (ODY) value. In the context of ODB, ODM, ODC and ODY values, the higher the value, the darker the respective black, magenta, cyan or yellow colour formed.

The ODB, ODM, ODC and ODY value quantifies the optical density on the respective black, magenta, cyan or yellow colour scale from low to high values, where ODB, ODM, ODC and ODY measurements can be made using a standard instrument densitometer and X-Rite eXact or SpectroEye or TechKon SpectroDens spectrophotometer.

The difference, ΔODB, ΔODM, ΔODC or ΔODY in measured optical density between the image (ODB, ODM, ODC or ODY value) and the un-imaged composition background, i.e. the part(s) of the composition on the substrate that have not been exposed to radiation (background ODB, ODM, ODC or ODY) can also be measured.

In the context of the present invention, effective formation of colour or an image is demonstrated by measurement of an ODB, ODM, ODC or ODY value of 1.05 or more, preferably 1.1 or more. Such a value demonstrates good optical density, i.e. formation of a strong (intense) colour or strongly-coloured image of high density having good contrast against the background of the composition.

Typically, the colour or image formed will be retained under ambient conditions for at least 3 days, preferably for at least 4 days, more preferably for at least 1 or even at least 2 weeks, and most preferably, for at least 2 months. "Ambient conditions" and like terms as used herein, refers to the normal range of conditions of the surrounding environment to which the colour-forming compounds are exposed, i.e. the range of temperatures, pressures and atmospheric conditions to which the compounds are exposed during use, storage and otherwise. This includes solar radiation including electromagnetic radiation of X-rays, ultraviolet (UV) and infrared (IR) radiation.

Typically, ambient conditions include a temperature of from 10 to 35° C., a pressure of from 20 to 100 kPa, and the environment is typically an oxygen-containing atmosphere.

"Monochromic" or "single-coloured image" and like terms used herein, refer to an image that is human and/or machine readable and has a single colour that is visible to the human eye. In the context of the present invention, the background part(s) of the composition according to the first, second and third aspects (and as used in all other aspects) of the present invention may form part of the monochromic image.

"Multi-coloured image" and like terms as used herein, refers to an image that is human and/or machine readable having multiple colours, i.e. two or more that are visible to the human eye. In the context of the present invention, the background part(s) of the composition according to the first, second and third aspects (and as used in all other aspects) of the present invention may form part of the multi-coloured image.

"Radiation" and like terms used herein refers to energy in the form of waves or particles, and in particular, refers to electromagnetic radiation such as ultraviolet (UV), visible, near-infrared (NIR) and infrared (IR) particle radiation, e.g. alpha (a) radiation, beta (6) radiation, neutron radiation and plasma. The wavelength ranges of the different regions of the electromagnetic spectrum are known to a skilled person. For completeness, by the term "near-infrared radiation" is meant radiation in the near-infrared region of the electromagnetic spectrum, and having a wavelength of from 780 nm to 2500 nm, preferably 780 nm to 1600 nm. Typically, the near-infrared radiation is applied at wavelengths of 780 nm to 1600 nm when using commercially available fibre lasers. By the term "mid-infrared radiation" is meant radiation in the mid-infrared region of the electromagnetic spectrum, and having a wavelength of from 2500 nm to 50000 nm, preferably 9000 to 12000 nm, or 9300 nm, 9600 nm, 10200 nm or 10600 nm, or more preferably 10600 nm. Typically, the mid-infrared radiation is applied at wavelengths of 9000 to 12000 nm such as 9300 nm, 9600 nm, 10200 nm or 10600 nm, preferably 10600 nm using commercially available $CO_2$ lasers.

By the term "laser source(s)" and like terms used herein is meant any suitable commercial or non-commercial laser source(s). Suitable examples include, but are not limited to a fibre laser, fibre-coupled laser diode array, $CO_2$ laser, laser diode array or direct diode laser for providing radiation, including near-infrared or mid-infrared radiation.

The composition on the substrate is exposed to either near-infrared or mid-infrared radiation. The composition on the substrate is exposed to near-infrared radiation having a wavelength of from 780 to 1600 nm or mid-infrared radiation having a wavelength of from 9000 to 12,000 nm. Preferably, the composition is exposed to near-infrared radiation having a wavelength of from 780 to 1600 nm or mid-infrared radiation having a wavelength of 9300, 9600, 10200 or 10600 nm. Preferably, the composition is exposed to near-infrared radiation having a wavelength of from 780 to 1600 nm or mid-infrared radiation having a wavelength of 10600 nm. More preferably, the composition is exposed to near-infrared radiation. More preferably, the composition is exposed to near-infrared radiation having a wavelength of from 780 to 1600 nm.

The near-infrared or mid-infrared radiation may be applied to the substrate to develop colour over the whole of the composition or selectively develop the colour of the colour-forming compound at localised positions of the composition in order to form a desired image. Preferably, colour is selectively developed at different localised positions of the composition on the substrate.

It will be understood by a skilled person that a multi-coloured image may be formed if: a colour-forming compound capable of forming more than one colour is utilised in the composition according to the first, second or third aspect of the present invention (e.g. a diacetylene compound); a combination of colour-forming compounds are present in the composition according to the first, second or third aspect of the present invention; or if a different colour-forming compound to that in the composition according to the first, second or third aspect of the present invention is present in a one or more additional layer of a multi-layer construction discussed above. The colour of each colour-forming compound can be selectively developed at localised positions of the composition.

The near-infrared or mid-infrared radiation may be applied to the composition using any suitable means. Suitable means include through laser excitation through application of near-infrared or mid-infrared radiation to the composition and thus the colour-forming compound by a laser source(s). The near-infrared radiation is typically applied using an NIR fibre diode laser. The mid-infrared radiation is typically applied using a $CO_2$ laser. It will be understood by a skilled person that the near-infrared or mid-infrared radiation may be applied to the composition at localised positions to selectively develop the colour of the colour-forming compound at these localised positions of the composition. These localised positions may overlap with each other. Alternatively, it will be appreciated by a skilled person that the near-infrared or mid-infrared radiation may be applied to the composition on or within the substrate by flood illumination, meaning that the composition as a whole is flooded with radiation. This can be done using a lamp or bulb, such as an IR lamp; a diode bar; or LED(s). It will be understood by a skilled person that the radiation is applied to the composition for an appropriate amount of time required to facilitate the formation of colour by the colour-forming compound. Typically, the time required to deliver sufficient radiation will depend upon the power of the means used to apply radiation and the method of application i.e. at localised positions, or by flood illumination. For example, in one embodiment, the near-infrared or mid-infrared radiation may be applied to colour-forming compound for less than 120 seconds, or for less than 60 seconds, such as for less than 20 seconds, or even less than 10 seconds or less than 5 seconds.

It will be appreciated that the radiation dosage of the near-infrared or mid-infrared radiation applied using a laser source(s) to achieve formation of colour can be controlled by alteration of the time for which the radiation is applied, the power of the means used to apply the radiation (wattage) and thus the fluence (amount of energy delivered per unit area) delivered by a laser source(s), i.e. $J/cm^2$.

It will be further appreciated that if more than one colour-forming compound is present, the fluence of the near-infrared radiation applied required to facilitate formation of colour using the different colour-forming compounds may be different.

Upon exposure to near-infrared or mid-infrared radiation, the colour-forming compound may form any colour. It will be appreciated that if a combination of colour-forming compounds is present in the composition, the colours formed by the colour-forming compounds will typically be different. It will be further appreciated by a skilled person that the means used to apply the near-infrared or mid-infrared radiation will affect the colour formed. For example, where a laser source(s) is used to apply the near-infrared or mid-infrared radiation, the fluence (amount of energy delivered per unit area) may affect the intensity, and thus optical density, of the colour formed. In the context of the present invention, the fluence is dependent upon the power of the means used to apply the near-infrared radiation (wattage), and the time for which the near-infrared radiation is applied to a particular localised position on the substrate, which can be controlled by the scanning speed of the laser or the speed of the moving stage. These two variables can be altered to change the fluence. Where the fluence is low (e.g. lower power and/or shorter irradiation times), the colour formed by the colour-forming compound will be of a less intense colour (lower optical density with lower ODB, ODM, ODC or ODY value), and where the fluence is high, the colour formed by the colour-forming compound will be of a more intense colour (higher optical density with higher ODB, ODM, ODC or ODY value). When a keto acid compound is utilised as the colour-forming compound, changing the fluence may also result in the colour of the colour-forming compound changing colour. For example, low fluence may form a yellow colour, and higher fluence may form an orange or red colour. In the context of the present invention, fluence values may range from 0.01 to 50 $J/cm^2$, such as from 0.1 to 20 $J/cm^2$, and even from 0.5 to 10 $J/cm^2$, such as from 0.5 to 5 $J/cm^2$.

It will be appreciated that, as discussed above, the present invention enables a low power near-infrared or mid-infrared radiation source, providing low fluence, to be utilised to provide the near-infrared or mid-infrared radiation, the heat transfer agent facilitating much more efficient heat transfer from the near-infrared radiation absorbing compound to the colour-forming compound. In the context of the present invention, by "low power" is meant below 100 watts, such as below 50 watts per singular laser source(s). This can be multiplied with combinations of multiple laser source(s) such as in laser arrays.

As previously discussed, it will be understood by a skilled person that additional stimuli can be applied to the composition. For example, an additional stimulus such as UV radiation can be applied to a composition comprising a diacetylene compound as a colour-forming compound to achieve initial first colour formation. This additional stimuli can be applied to the composition using any suitable means, including using laser source(s) for application at localised positions and by flood illumination for application across the whole composition as detailed above for the application of near-infrared radiation, but using appropriate sources such as a broadband UV lamp source or UV laser(s) for the application of UV radiation. It will be appreciated that exposure of the composition to near-infrared or mid-infrared radiation and such additional stimuli will be conducted in the appropriate order required to from the desired image, and will be dependent upon the contents of the composition, i.e. the colour-forming compounds present in the composition. It will further be appreciated that the near-infrared or mid-infrared radiation and the additional stimuli may be applied at the same localised position of the composition.

According to a sixteenth aspect of the present invention, there is provided a use of the composition according to the first aspect of the present invention in the formation of colour on a substrate by the application of near-infrared or mid-infrared radiation.

According to a seventeenth aspect of the present invention, there is provided a use of the composition according to the second aspect of the present invention in the formation of colour on a substrate by the application of near-infrared or mid-infrared radiation.

According to an eighteenth aspect of the present invention, there is provided a use of the composition according to the third aspect of the present invention in the formation of colour on a substrate by the application of near-infrared or mid-infrared radiation.

According to a nineteenth aspect of the present invention, there is provided a use of the composition according to the first aspect of the present invention in the formation of an image on a substrate by the application of near-infrared or mid-infrared radiation.

According to a twentieth aspect of the present invention, there is provided a use of the composition according to the second aspect of the present invention in the formation of an image on a substrate by the application of near-infrared or mid-infrared radiation.

According to a twenty-first aspect of the present invention, there is provided a use of the composition according to the third aspect of the present invention in the formation of an image on a substrate by the application of near-infrared or mid-infrared radiation.

It will be appreciated by a skilled person that the near-infrared radiation or mid-infrared radiation or additional stimuli applied to the compositions disclosed herein, whether by a laser source(s) or flood illumination, is applied using an apparatus suitable for such purpose, i.e. suitable for calculating and controlling the near-infrared radiation or additional stimuli required to produce a desired colour or image and applying it to a composition on the substrate. It will be appreciated that the apparatus will be programmed to effect the application of the near-infrared radiation, mid-infrared radiation or other stimuli to the compositions in the required order and facilitate the formation of an image.

Chemical Definitions

The term "$C_{1-20}$ alkyl" denotes a straight or branched saturated alkyl group having from 1 to 20 carbon atoms; optionally "$C_{1-20}$ alkyl" groups can contain some degree of unsaturation (partial unsaturation) i.e. may contain one or more alkene/alkenyl moiety(s). For parts of the range $C_{1-20}$ alkyl, all sub-groups thereof are contemplated, such as $C_{1-10}$ alkyl, $C_{6-16}$ alkyl, $C_{6-10}$ alkyl, and $C_{1-6}$ alkyl. Examples of said $C_{1-4}$ alkyl groups include methyl, ethyl, n-propyl, iso-propyl, n-butyl, iso-butyl, sec-butyl, and tert-butyl. The alkyl groups may be optionally substituted with one or more functional groups, including $C_{1-20}$ alkyl groups, "$C_{6-12}$ aryl", and "$C_{1-18}$ alkoxy", halogen, and "$C_{3-18}$ cycloalkyl".

The term "$C_{1-18}$ alkoxy" denotes a straight of branched $C_{1-18}$ alkyl group which is attached to the remainder of the molecule through an oxygen atom. For parts of the range $C_{1-18}$ alkoxy, all sub-groups thereof are contemplated such as $C_{1-10}$ alkoxy, $C_{5-15}$ alkoxy, $C_{5-10}$ alkoxy, and $C_{1-6}$ alkoxy. Examples of said $C_{1-4}$ alkoxy groups include methoxy, ethoxy, n-propoxy, iso-propoxy, n-butoxy, iso-butoxy, sec-butoxy, and tert-butoxy. The alkoxy groups may be optionally substituted with other functional groups. The alkoxy groups may be optionally substituted with one or more functional groups, including $C_{1-18}$ alkyl groups, "$C_{6-12}$ aryl", and "$C_{1-18}$ alkoxy", halogen, and "$C_{3-18}$ cycloalkyl".

The term "$C_{6-12}$ aryl" denotes a monocyclic or polycyclic conjugated unsaturated ring system having from 6 to 12 carbon atoms. For parts of the range $C_{6-12}$ aryl, all sub-groups thereof are contemplated, such as $C_{6-10}$ aryl, $C_{10-12}$ aryl, and $C_{6-8}$ aryl. An aryl group includes condensed ring groups such as monocyclic ring groups, or bicyclic ring groups. Examples of $C_{6-12}$ aryl groups include phenyl, biphenyl, indenyl, naphthyl or azulenyl. Condensed rings such as indan and tetrahydro naphthalene are also included in the $C_{6-12}$ aryl group. The aryl groups may be optionally substituted with other functional groups. The aryl groups may be optionally substituted with one or more functional groups, including $C_{1-18}$ alkyl groups, halogen, and "$C_{1-18}$ alkoxy". The aryl groups may be substituted with these substituents at a single position on their unsaturated ring system, or may be substituted with these substituents at multiple positions on their unsaturated ring system.

The term "$C_{3-18}$ cycloalkyl" denotes a non-aromatic, saturated or partially saturated (i.e. may contain one or more alkene or alkenyl moiety(s)) monocyclic ring system having from 3 to 18 carbon atoms. For parts of the range $C_{3-18}$ cycloalkyl, all sub-groups thereof are contemplated, such as $C_{3-8}$ cycloalkyl, $C_{5-15}$ cycloalkyl, and $C_{5}$-10 cycloalkyl. Examples of suitable $C_{3-10}$ cycloalkyls include cyclopropyl, cyclobutyl, cyclopentyl, cyclohexyl and cycloheptyl. The cycloalkyl groups may be optionally substituted with other functional groups. The cycloalkyl groups may be optionally substituted with one or more functional groups, including $C_{1-20}$ alkyl groups, "$C_{5-20}$ aryl", "$C_{1-20}$ alkoxy", "hydroxyl$C_{1-20}$ alkoxy" and "$C_{3-18}$ cycloalkyl".

The terms "unsaturated" and "partially saturated" refer to rings wherein the ring structure(s) contains atoms sharing more than one valence bond i.e. the ring contains at least one multiple bond e.g. a C=C, C≡C or N=C bond. The term "fully saturated" refers to rings where there are no multiple bonds between ring atoms.

"Optional" or "optionally" means that the subsequently described event or circumstance may but need not occur, and that the description includes instances where the event or circumstance occurs and instances in which it does not.

"Halogen" refers to fluorine, chlorine, bromine or iodine.

The term "heterocyclic ring" denotes a non-aromatic, saturated or partially saturated monocyclic or polycyclic ring system having from 4 to 18 ring atoms in which one or more of the ring atoms is not carbon, e.g. nitrogen, sulphur or oxygen. The said ring system may be attached to the rest of the molecule through either a heteroatom or a carbon atom of the ring system. Examples of heterocyclic groups include but are not limited to: piperidinyl, morpholinyl, homomorpholinyl, azepanyl, piperazinyl, oxo-piperazinyl, diazepinyl, tetrahydropyridinyl, tetrahydropyranyl, pyrrolidinyl, tetrahydrofuranyl and dihydropyrrolyl.

The term "heteroaryl" denotes a monocyclic or polycyclic hetero-aromatic group comprising 5 to 18 atoms in which one or more of the atoms are other than carbon, such as nitrogen, phosphorus, sulphur or oxygen. The said heteroaromatic ring may be attached to the rest of the molecule through either a heteroatom or a carbon atom of the ring system. Examples of heteroaryl groups include but are not limited to furyl, pyrrolyl, thienyl, oxazolyl, isoxazolyl, oxadiazolyl, imidazolyl, oxatriazolyl, thiazolyl, isothiazolyl, tetrazolyl, pyrazolyl, pyridinyl, pyrimidinyl, pyridazinyl, pyrazinyl, triazinyl and thiadiazolyl. In some embodiments, the heteroaryl group contains at least one ring nitrogen atom. The nitrogen atoms in the heteroaryl groups can be basic, as in the case of an imidazole or pyridine, or essentially non-basic as in the case of an indole or pyrrole nitrogen. In general the number of basic nitrogen atoms present in the heteroaryl group, including any amino group substituents of the ring, will be less than five.

The term "cyclic amino group" refers to a non-aromatic, fully saturated or partially unsaturated monocyclic ring system having from 4 to 18 ring atoms in which one of the ring atoms is nitrogen and the group is attached to the rest of the molecule via this nitrogen atom. In such cyclic amino groups, one or more of the remaining ring atoms may be other than carbon, such as nitrogen, sulphur or oxygen. Examples of such cyclic amino groups include piperidine (1-piperidinyl), pyrrolidine (1-pyrrolidinyl), pyrrolidone, morpholine or piperazine.

All references to particular chemical compounds herein are to be interpreted as covering the compounds per se, and also, where appropriate, derivatives, hydrates, solvates, complexes, isomers and tautomers thereof.

All of the features contained herein may be combined with any of the above aspects and in any combination.

For a better understanding of the present invention, and to show how embodiments of the same may be carried into effect, reference will now be made, by way of example, to the following experimental data.

EXAMPLES

For each of the examples, unless otherwise stated, the composition is either colourless, off-white or white upon formulation and application to the substrate prior to exposure to radiation. The background of the composition, i.e. the part(s) not exposed to the radiation remain colourless, off-white or white.

For each of the examples, unless otherwise stated, an NIR fibre diode laser with a wavelength of 1070 nm is utilised. The laser has the following fluence settings: 1.33, 1.39, 1.55, 1.61, 1.75, 2.00, 2.16, 2.37, 2.53 and 2.86 J/cm². Fluence of 2.37 and 2.53 J/cm² was utilised for each of the examples.

Example 1

A composition according to the invention was prepared according to Table 1. All amounts are in weight percentage (wt %).

TABLE 1

| Components of Composition | Wt % |
| --- | --- |
| Reduced doped tungsten oxide (near-infrared radiation absorbing compound) | 0.75 |
| AOM (colour-forming compound: oxyanion of a multivalent metal) | 35 |
| Zirconium oxide (heat transfer agent) | 10 |
| Polyurethane resin: Casathane 920 purchased from Thomas Swan (a binder and carrier component) | 12 |
| Nitrocellulose NC DLX 3-5 purchased from Nobel NC (a binder and carrier component) | 5 |
| Ethanol (solvent) | 18.625 |
| Ethyl Acetate (solvent) | 18.625 |

The composition was diluted with a 1:1 additional blend of ethanol to ethyl acetate to acquire a print viscosity of 200 cP (0.2 pascal-seconds). The composition was gravure printed at 5 gsm onto a polypropylene film substrate.

Near-infrared radiation was then applied to the composition at localised positions using a fibre diode laser with a wavelength of 1070 nm such that the colour was formed at the localised positions. A black colour was formed at these localised positions facilitating the formation of an image.

Comparative Example 1

A composition was prepared according to Table 2 in which no heat transfer agent is present. All amounts are in weight percentage (wt %).

TABLE 2

| Components of Composition | Wt % |
| --- | --- |
| Reduced doped tungsten oxide (near-infrared radiation absorbing compound) (same as Example 1) | 0.75 |
| AOM (colour-forming compound: oxyanion of a multivalent metal) | 35 |
| Zirconium oxide (heat transfer agent) | 0 |
| Polyurethane resin: Casathane 920 purchased from Thomas Swan (binder and carrier component) | 12 |
| Nitrocellulose NC DLX 3-5 purchased from Nobel NC (binder and carrier component) | 5 |
| Ethanol (solvent) | 23.625 |
| Ethyl Acetate (solvent) | 23.625 |

The composition was diluted with a 1:1 additional blend of ethanol to ethyl acetate to acquire a print viscosity of 200 cP (0.2 pascal seconds). The composition was gravure printed at 5 gsm onto a polypropylene film substrate.

Near-infrared radiation was then applied to the composition at localised positions using a fibre diode laser with a wavelength of 1070 nm such that colour was formed at the localised positions. A black colour was formed at these localised positions facilitating the formation of an image.

Background Colouration Measurements for Example 1 and Comparative Example 1

This measurement demonstrates how the presence of a heat transfer agent in the composition according to the present invention does not contribute to background colouration.

ΔE was calculated using an X-Rite SpectroEye spectrophotometer.

L*a*b* values of the composition following application to the substrate, but prior to exposure to the near-infrared radiation were measured for both Example 1 and Comparative Example 1 (CIE L*a*b* colour system, L* denotes lightness, a* denotes the red/green values, and b* denotes the yellow/blue values). These L*a*b* measurements for Example 1 and Comparative Example 1 were then used alongside L*a*b* measurements for a standard white tile to determine ΔE values for each of Example 1 and Comparative Example 1, i.e. the visually perceived difference between the colour of the composition of Example 1 or Comparative Example 1 and the white tile. ΔE is a standard mathematical calculation which allows for the quantification of the visual perception of the difference between two colours i.e. between the background colour of the composition of Example 1 or Comparative Example 1, and the white tile. The calculation is given below:

$$\Delta E = \sqrt{(L_1 - L_2)^2 + (a_1 - a_2)^2 + (b_1 - b_2)^2}$$

For Example 1, ΔE was calculated at 5.48. For Comparative Example 1, ΔE was calculated as 5.28. The difference between the two ΔE values is 0.2. A value of ΔE of less than 2 is indistinguishable to the human eye. The ΔE values measured for Example 1 and Comparative Example 1 therefore demonstrate that the heat transfer agent does not have significant impact on the background colouration of the composition according to the present invention.

Optical Density Black (ODB) Measurements for Example 1 and Comparative Example 1

ODB was calculated using an X-Rite SpectroEye spectrophotometer.

For Example 1, ODB was measured as 1.36. For Comparative Example 1, ODB was measured as 1.01.

An ODB value of 1.05 or more such as 1.1 or more is desired. Such an ODB value demonstrates a good optical density, i.e. formation of a strong black colour with good contrast against the background. It can be seen that the ODB value for Example 1 is greater than that for Comparative Example 1, the composition of Example 1 thus demonstrating improved optical density and colour/image formation. This is a result of the increased heat transfer from the near-infrared radiation absorbing compound to the colour-forming compound via the heat transfer agent.

Example 2

A composition according to the invention was prepared according to Table 3. All amounts are in weight percentage (wt %).

TABLE 3

| Component of the Composition | Wt % |
| --- | --- |
| Reduced doped tungsten oxide (near-infrared radiation absorbing compound) | 0.75 |
| 2-anilino-6-dibutylamino-3-methylfluoran (colour-forming compound: leuco dye) | 10 |
| Tri-n-butylammonium,4,4'-dioxo-4H,4'H-2,2'-spirobi[benzo[d][1,3,2]dioxaborinin]-2-uide (acid-generating agent) | 18.5 |
| Zirconium oxide (heat transfer agent) | 5 |
| Joncryl ECO675 purchased from BTC/BASF (binder and carrier component: styrene-acrylic copolymer) | 64.75 |
| Vegetable oil (antifoaming agent) | 1 |

The composition was diluted with water to acquire a print viscosity of 270 cP (0.27 pascal second). The composition was gravure printed at 3 gsm onto a paper substrate.

Near-infrared radiation was then applied to the composition at localised positions using a fibre diode laser with a wavelength of 1070 nm such that colour was formed at the localised positions. A black colour was formed at these localised positions facilitating the formation of an image.

Example 3

A composition according to the invention was prepared according to Table 3, but zirconium oxide was replaced with aluminium zinc oxide. All amounts are in weight percentage (wt %).

The composition was diluted with water to acquire a print viscosity of 270 cP (0.27 pascal seconds). The composition was gravure printed at 3 gsm onto a paper substrate.

Near-infrared radiation was then applied to the composition at localised positions using a fibre diode laser with a wavelength of 1070 nm such that colour was formed at the localised positions. A black colour was formed at these localised positions facilitating the formation of an image.

Example 4

A composition according to the invention was prepared according to Table 3, but zirconium oxide was replaced with titanium dioxide TR52. All amounts are in weight percentage (wt %).

The composition was diluted with water to acquire a print viscosity of 270 cP (0.27 pascal seconds). The composition was gravure printed at 3 gsm onto a paper substrate.

Near-infrared radiation was then applied to the composition at localised positions using a fibre diode laser with a wavelength of 1070 nm such that colour was formed at the localised positions. A black colour was formed at these localised positions facilitating the formation of an image.

Comparative Example 2

A composition was prepared according to Table 4 in which no heat transfer agent is present. All amounts are in weight percentage (wt %).

TABLE 4

| Components of the Composition | Wt % |
|---|---|
| Reduced doped tungsten oxide (near-infrared radiation absorbing compound) (same as Examples 2 to 4) | 0.75 |
| 2-anilino-6-dibutylamino-3-methylfluoran (colour-forming compound: leuco dye) | 10 |
| Tri-n-butylammonium,4,4'-dioxo-4H,4'H-2,2'-spirobi[benzo[d][1,3,2]dioxaborinin]-2-uide (acid-generating agent) | 18.5 |
| Zirconium oxide (heat transfer agent) | 0 |
| Joncryl ECO675 purchased from BTC/BASF (binder and carrier component: styrene-acrylic copolymer) | 69.75 |
| Vegetable oil (antifoaming agent) | 1 |

The composition was diluted with water to acquire a print viscosity of 270 cP (0.27 pascal seconds). The composition was gravure printed at 3 gsm onto a paper substrate.

Near-infrared radiation was then applied to the composition at localised positions using a fibre diode laser with a wavelength of 1070 nm such that colour was formed at the localised positions. A black colour was formed at these localised positions facilitating the formation of an image.

Background Colouration Measurements for Examples 2, 3 and 4 and Comparative Example 2

This measurement demonstrates how the presence of a heat transfer agent in the composition according to the present invention does not contribute to background colouration.

$\Delta E$ was calculated using an X-Rite SpectroEye spectrophotometer.

L*a*b* values of the composition following application to the substrate, but prior to exposure to the near-infrared radiation were measured for Examples 2, 3 and 4 and Comparative Example 2 (CIE L*a*b* colour system, L* denotes lightness, a* denotes the red/green values, and b* denotes the yellow/blue values). These L*a*b* measurements for Examples 2, 3 and 4 and Comparative Example 2 were then used alongside L*a*b* measurements for a standard white tile to determine $\Delta E$ values for each of Examples 2, 3 and 4 and Comparative Example 2, i.e. the visually perceived difference between the colour of the composition of Example 2, 3, 4 or Comparative Example 2 and the white tile. $\Delta E$ is a standard mathematical calculation which allows for the quantification of the visual perception of the difference between two colours i.e. between the background colour of the composition of Example 2, 4, 4 or Comparative Example 2, and the white tile. The calculation is given below:

$$\Delta E = \sqrt{(L_1 - L_2)^2 + (a_1 - a_2)^2 + (b_1 - b_2)^2}$$

For Example 2, $\Delta E$ was calculated at 3.05. For Example 3, $\Delta E$ was calculated as 3.55. For Example 4, $\Delta E$ was calculated at 3.2. For Comparative Example 2, $\Delta E$ was calculated as 3.73. The difference between $\Delta E$ values for Example 2 and Comparative Example 2 is 0.68. The difference between $\Delta E$ values for Example 3 and Comparative Example 2 is 0.18. The difference between $\Delta E$ values for Example 4 and Comparative Example 2 is 0.53. A value of $\Delta E$ of less than 2 is indistinguishable to the human eye. The $\Delta E$ values measured for Examples 2, 3 and 4 and Comparative Example 2 therefore demonstrate that the heat transfer agent does not have significant impact on the background colouration of the composition according to the present invention. In addition, the lower value of $\Delta E$ for Examples 2, 3 and 4 demonstrate a lower background colouration than Comparative Example 2 for improved laser imaging performance.

Optical Density Black (ODB) Measurements for Examples 2, 3 and 4 and Comparative Example 2

ODB was calculated using an X-Rite SpectroEye spectrophotometer.

For Example 2, ODB was measured as 1.25. For Example 3, ODB was measured as 1.16. For Example 4, ODB was measured as 1.2. For Comparative Example 2, ODB was measured as 0.85.

An ODB value of 1.05 or more such as 1.1 or more is desired. Such an ODB value demonstrates a good optical density, i.e. formation of a strong black colour with good contrast against the background. Not only is the ODB value of Comparative Example 2 less than 1.05, it can be seen that the ODB value for Examples 2, 3 and 4 are greater than that of Comparative Example 2, the compositions of Examples 2, 3 and 4 thus demonstrating improved optical density and colour/image formation. This is a result of the increased heat transfer from the near-infrared radiation absorbing compound to the colour-forming compound via the heat transfer agent.

What is claimed:

1. A composition comprising: a near-infrared radiation absorbing compound; a colour-forming compound; and a heat transfer agent operable to facilitate heat transfer from the near-infrared radiation absorbing compound to the colour-forming compound; wherein the ratio of near-infrared radiation absorbing compound to heat transfer agent in the laser-reactive composition is 1:1 to 1:100, and the heat transfer agent is present in the composition as solid particles, and
wherein the heat transfer agent is selected from a metal oxide, a metal pyrophosphate, and a metal phosphate,
wherein the heat transfer agent has a D50 particle size distribution value of 5 µm or less,
wherein the composition further comprises one or more binder and carrier component, and
wherein the one or more binder and carrier component has a glass transition temperature of from −60 to 120° C.

2. The composition according to claim 1, wherein the heat transfer agent is a metal phosphate of at least one of the following metals: iron, aluminium, zinc, zirconium and titanium.

3. The composition according to claim 1, wherein the heat transfer agent is a metal oxide.

4. The composition according to claim 1, wherein the colour-forming compound is selected from the group consisting of a leuco dye, an oxyanion of a multivalent metal, a diacetylene compound, a keto acid compound, and a combination thereof.

5. The composition according to claim 1, wherein the ratio of near-infrared radiation absorbing compound to heat transfer agent in the composition is 1:1 to 1:50.

6. The composition according to claim 1, wherein the ratio of near-infrared radiation absorbing compound to heat transfer agent in the composition is 1:1.5 to 1:18.

7. The composition according to claim 6, wherein the ratio of near-infrared radiation absorbing compound to heat transfer agent in the composition is 1:1.7 to 1:15.

8. The composition according to claim 1, wherein the near-infrared radiation absorbing compound is present in an amount of 0.1 to 3.5 wt % of the composition, and the heat transfer agent is present in an amount of 1 to 15 wt % of the composition.

9. The composition according to claim 1, wherein the near-infrared radiation absorbing compound is present in an amount of 0.2 to 1.75 wt % of the composition, and the heat transfer agent is present in an amount of 2 to 12 wt % of the composition.

10. The composition according to claim 9, wherein the near-infrared radiation absorbing compound is present in an amount of 0.5 to 1.5 wt % of the composition, and the heat transfer agent is present in an amount of 2-10 wt % of the composition.

11. The composition according to claim 1, wherein the near-infrared radiation absorbing compound is selected from inorganic copper salts, organic NIR dyes and pigments, non-stoichiometric inorganic compounds, and conductive polymers.

12. The composition according to claim 1, wherein the one or more binder and carrier component is selected from: polymeric binders; vinyl polymers; polyolefins and hydrogenated or epoxidised products thereof; aldehyde-containing polymers; epoxy-containing polymers; polyamides; polyesters; polyurethanes; sulphone-containing polymers; natural products and derivatives thereof; and cellulose-based polymers.

13. The composition according to claim 1, wherein the one or more binder and carrier component has a glass transition temperature of from −60 to 40° C.

14. The composition according to claim 1, wherein the one or more binder and carrier component has a minimum film forming temperature of from −10 to 120° C.

15. The composition according to claim 1, wherein the one or more binder and carrier component has a minimum film forming temperature of from −10 to 40° C.

16. A substrate comprising the composition of claim 1 applied thereon.

17. The substrate according to claim 16, wherein the composition displays colour.

18. The substrate according to claim 16, wherein the composition displays an image.

19. The substrate according to claim 16, wherein the substrate is a heat-sensitive substrate.

20. The substrate according to claim 16, wherein the substrate further comprises one or more additional layers applied thereto so as to form a multi-layer construction.

21. The substrate according to claim 16, wherein the substrate is a multi-layer substrate construction.

22. A method of forming a substrate according to claim 16, the method comprising applying to a substrate the composition.

23. The method according to claim 22, wherein the method further comprises applying one or more additional layers to the substrate so as to form a multi-layer construction.

24. The method according to claim 22, wherein the substrate is a multi-layer substrate construction.

25. A method of forming colour on a substrate comprising the composition according to claim 1 applied thereon, the method comprising exposing the composition to near-infrared or mid-infrared radiation to form colour on the substrate.

26. A method of forming an image on a substrate comprising the composition according to claim 1 applied thereon, the method comprising exposing the composition to near-infrared or mid-infrared radiation to form an image on the substrate.

27. The method according to claim 25, wherein the near-infrared or mid-infrared radiation is applied at localised positions to selectively develop the colour of the colour-forming compound.

28. The composition according to claim 1, wherein the composition is used in the formation of colour on a substrate by the application of near-infrared or mid-infrared radiation.

29. The composition according to claim 1, wherein the composition is used in the formation of an image on a substrate by the application of near-infrared or mid-infrared radiation.

* * * * *